United States Patent
Li et al.

(10) Patent No.: US 11,095,546 B2
(45) Date of Patent: Aug. 17, 2021

(54) NETWORK DEVICE SERVICE QUALITY DETECTION METHOD AND APPARATUS

(71) Applicant: HUAWEI TECHNOLOGIES CO., LTD., Guangdong (CN)

(72) Inventors: Congjuan Li, Nanjing (CN); Feng Li, Nanjing (CN); Yue Yin, Nanjing (CN); Xingwang Zhou, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 6 days.

(21) Appl. No.: 16/204,788

(22) Filed: Nov. 29, 2018

(65) Prior Publication Data
US 2019/0109776 A1 Apr. 11, 2019

Related U.S. Application Data

(63) Continuation of application No. PCT/CN2017/086372, filed on May 27, 2017.

(30) Foreign Application Priority Data

May 30, 2016 (CN) .......................... 201610371221.9

(51) Int. Cl.
H04L 12/24 (2006.01)
H04L 12/26 (2006.01)
H04L 12/851 (2013.01)

(52) U.S. Cl.
CPC .......... H04L 43/10 (2013.01); H04L 41/0843 (2013.01); H04L 41/5038 (2013.01);
(Continued)

(58) Field of Classification Search
CPC . H04L 47/2441; H04L 47/24; H04L 47/2425; H04L 47/2483; H04L 47/2408;
(Continued)

(56) References Cited

U.S. PATENT DOCUMENTS 9,667,518 B2 * 5/2017 Lakshmikantha .... H04L 47/562
9,912,566 B1 * 3/2018 Penno ..................... H04L 43/10
(Continued)

FOREIGN PATENT DOCUMENTS

CN 101316237 A 12/2008
CN 101720548 A 6/2010
(Continued)

OTHER PUBLICATIONS

ITU-T G.8013/Y.1731,Telecommunication Standardization Sector of ITU, Operation, administration and maintenance (OAM) functions and mechanisms for Ethernet-based networks, Aug. 2015, 102 pages.

*Primary Examiner* — Jae Y Lee
*Assistant Examiner* — Aixa A Guadalupe Cruz
(74) *Attorney, Agent, or Firm* — Womble Bond Dickinson (US) LLP

(57) ABSTRACT

This application provides a network device service quality detection method and apparatus. A service function feature of a network device is built into a service template as a fixed part. An operation and maintenance engineer does not need to learn of a service function feature of each network device, and only needs to provide information such as a flow identifier and deployment information that are of a to-be-detected service flow. A controller dynamically deploys a detection point according to the flow identifier and the deployment information of the service flow that are provided by the operation and maintenance engineer and the fixed part of the service template, so as to automatically detect service quality of a network device, and reduce operation and maintenance complexity and difficulties.

18 Claims, 9 Drawing Sheets

(52) U.S. Cl.
CPC ........ *H04L 43/026* (2013.01); *H04L 47/2441* (2013.01); *H04L 43/0835* (2013.01); *H04L 43/0858* (2013.01); *H04L 43/106* (2013.01); *H04L 47/24* (2013.01)

(58) Field of Classification Search
CPC ....... H04L 47/31; H04L 47/125; H04L 43/10; H04L 41/0843; H04L 43/026; H04L 43/106; H04L 43/0835; H04L 43/0858; H04L 41/5038; H04W 76/12; H04W 76/18

See application file for complete search history.

(56) References Cited

U.S. PATENT DOCUMENTS

| | | |
|---|---|---|
| 2016/0057234 A1 | 2/2016 | Parikh et al. |
| 2016/0337196 A1 | 11/2016 | Zhang et al. |
| 2017/0257310 A1* | 9/2017 | Patil ...................... H04L 47/115 |
| 2018/0198705 A1* | 7/2018 | Wang .................. H04L 12/4633 |
| 2019/0081894 A1* | 3/2019 | Yousaf .................. H04L 45/745 |

FOREIGN PATENT DOCUMENTS

| | | |
|---|---|---|
| CN | 102790755 A | 11/2012 |
| CN | 102882722 A | 1/2013 |
| CN | 104378298 A | 2/2015 |
| CN | 105227393 A | 1/2016 |
| CN | 105474579 A | 4/2016 |
| EP | 2145456 B1 | 1/2010 |
| EP | 2680510 A1 | 1/2014 |
| EP | 3091693 A1 | 11/2016 |
| WO | 2013104375 A1 | 7/2013 |
| WO | 2015113285 A1 | 8/2015 |
| WO | 20161004984 A1 | 1/2016 |

* cited by examiner

NETWORK DEVICE SERVICE QUALITY DETECTION METHOD AND APPARATUS

CROSS-REFERENCE TO RELATED APPLICATIONS

This application is a continuation of International Application No. PCT/CN2017/086372, filed on May 27, 2017, which claims priority to Chinese Patent Application No. 201610371221.9, filed on May 30, 2016. The disclosures of the aforementioned applications are hereby incorporated by reference in their entireties.

TECHNICAL FIELD

The present invention relates to the field of communications technologies, and in particular, to a network device service quality detection method and apparatus.

BACKGROUND

Operation, administration, and maintenance (OAM) are always important aspects of the telecommunications field, and may be used to monitor network performance and detect a network fault. Currently, there are a plurality of OAM standards and protocols for a conventional network device, for example, an ITU-T Y.1731 protocol for an Ethernet layer of the network device, a Packet Internet Groper (PING) command and a traceroute command for an Internet Protocol (IP) layer, and a label switched path (LSP) PING command and an LSP traceroute command for Multiprotocol Label Switching (MPLS).

A network device may be configured to perform a service function in a network. For example, a firewall may be configured to discard a type of packet, a load balancer (LB) may be configured to distribute requests to different processors, and a gateway (GW) may be used for protocol mapping.

However, in a conventional OAM method for a network device, only network reachability can be detected, and a service execution status of the network device cannot be detected, that is, service quality of the network device cannot be detected. For example, a service function for which a virtual extensible local area network gateway (VxLAN GW) is responsible is to convert a packet of a designated protocol into a VxLAN packet. A PING command may be used to detect whether a layer 2 forwarding function and/or a layer 3 forwarding function of the VxLAN GW are normal. However, a normal layer 2 and/or layer 3 network connection of a VxLAN GW does not mean that the service function for which the VxLAN GW is responsible is normal.

There are many types of services, but currently, there is no general method that can be used to detect service quality of service functions of a network device. Therefore, an operation and maintenance engineer needs to be familiar with a service function feature of the network device, and then manually deploy a detection point. Consequently, a burden is brought to the operation and maintenance engineer, and operation and maintenance difficulties and complexity are increased.

SUMMARY

This application provides embodiments of a network device service quality detection method, so as to detect service quality of service functions of various network devices.

A first aspect of this application provides a network device service quality detection method, including:

obtaining, by a controller, a flow identifier and deployment information that are of a to-be-detected service flow, where the deployment information is used to indicate a service function deployment location and a service function parameter that are corresponding to the service flow;

determining, by the controller, a service type of the to-be-detected service flow;

obtaining, by the controller, a predefined service template of the service type, where the service template includes a fixed part and a dynamic part, the fixed part is used to describe a service function feature of the service type, and the dynamic part is used to fill with specific information of the to-be-detected service flow;

determining, by the controller, a forwarding path of the service flow and a packet feature that should be presented by the service flow on each network device on the forwarding path according to the fixed part, the flow identifier, and the deployment information;

filling, by the controller, the dynamic part of the service template with the flow identifier, the deployment information, and the forwarding path that are of the service flow, and the packet feature that should be presented by the service flow on each network device on the forwarding path, to generate an expected template of the service flow; and detecting, by the controller, service quality of a network device on the forwarding path according to the expected template.

In one embodiment, the detecting, by the controller, service quality of a network device on the forwarding path according to the expected template includes:

instructing, by the controller according to the expected template, a first network device on the forwarding path to generate a first detection packet, and instructing, according to the expected template, the first network device to forward the first detection packet along the forwarding path;

instructing, by the controller according to the expected template, a second network device on the forwarding path to capture a second detection packet, where the second detection packet is a packet that is obtained after the first detection packet is forwarded to and has reached the second network device, and the second detection packet has at least one packet feature that should be presented by the service flow on the second network device as described in the expected template; and determining, by the controller, service quality of a network device between the first network device and the second network device on the forwarding path according to whether the second network device can capture the second detection packet and whether the second detection packet has all packet features that should be presented by the service flow on the second network device as described in the expected template.

In one embodiment, before the instructing, by the controller, a first network device on the forwarding path to generate a first detection packet, the method further includes:

obtaining, by the controller, detection requirement information of the service flow, where the detection requirement information includes a detection range, a detection time period, and a detection frequency, and the detection range includes at least one to-be-detected network device on the forwarding path;

using, by the controller, a network device, on the forwarding path, that appears first in the detection range as the first network device; and using, by the controller, each network device in the detection range on the forwarding path as the second network device, or using each network device other than the first network device in the detection range on the forwarding path as the second network device;

the instructing, by the controller, a first network device on the forwarding path to generate a first detection packet includes:

instructing, by the controller, the first network device on the forwarding path to generate at least one first detection packet according to the detection frequency within the detection time period; and the instructing, by the controller, a second network device on the forwarding path to capture a second detection packet includes:

instructing, by the controller, the second network device to capture the second detection packet within the detection time period.

Using this implementation, the controller may dynamically deploy a detection point according to a user requirement, so as to flexibly match various detection requirements, and implement bounding or positioning according to a requirement.

In one embodiment, a packet header of the first detection packet is the same as a packet header of a packet in the service flow, and a payload of the first detection packet and that of the second detection packet each includes a first field and a second field;

the first field is used to indicate that a packet is a detection packet;

the second field is used to indicate an action to be performed on a packet by a network device through which the packet passes through; and the action includes at least one of the following: adding a time stamp to a payload of the packet, forwarding the packet to a next-hop network device on the forwarding path, copying the packet and sending the copied packet to the controller, or discarding the packet.

In one embodiment, the packet feature includes an offset field, a length field, and a value field.

In an embodiment of this application, the packet feature is represented using an offset, a length, and a value. In this way, emerging services may be compatible with the packet feature. Certainly, a packet well known in the industry may also be represented using a specific field name. For example, a packet feature of an IP packet may be represented as follows: A destination IP address is IP A, and a source IP address is IP B.

In one embodiment, the determining, by the controller, service quality of a network device between the first network device and the second network device on the forwarding path according to whether the second network device can capture the second detection packet and whether the second detection packet has all packet features that should be presented by the service flow on the second network device as described in the expected template includes:

if the second network device can capture the second detection packet, and the second detection packet has all the packet features presented by the service flow on the second network device and that are described in the expected template, determining, by the controller, that all network devices between the first network device and the second network device on the forwarding path have a normal function; or if the second network device can capture the second detection packet, but the second detection packet does not have all the packet features that should be presented by the service flow on the second network device and that are described in the expected template, determining, by the controller, that at least one network device between the first network device and the second network device on the forwarding path is faulty; or if the second network device does not capture the second detection packet, determining, by the controller, that at least one network device between the first network device and the second network device on the forwarding path is faulty.

In one embodiment, the payload of the first detection packet and that of the second detection packet each further includes a sequence number that is used to identify a packet generation sequence, a sequence number included in the second detection packet is the same as a sequence number included in the first detection packet, and the controller determines, according to the sequence number, that the second detection packet is the packet that is obtained after the first detection packet is forwarded to and has reached the second network device;

the first detection packet and the second detection packet instruct, using the second field, a network device on the forwarding path to add a time stamp to the payload of the first detection packet or the second detection packet when forwarding the first detection packet or the second detection packet; and the determining, by the controller, service quality of a network device between the first network device and the second network device on the forwarding path according to whether the second network device can capture the second detection packet and whether the second detection packet has all packet features that should be presented by the service flow on the second network device and that are described in the expected template includes:

if the second network device can capture the second detection packet, and the second detection packet has all the packet features that should be presented by the service flow on the second network device and that are described in the expected template, calculating, by the controller, a delay between the first network device and the second network device according to a time stamp in the first detection packet and a time stamp in the second detection packet.

In one embodiment, the determining, by the controller, service quality of a network device between the first network device and the second network device on the forwarding path according to whether the second network device can capture the second detection packet and whether the second detection packet has all packet features that should be presented by the service flow on the second network device and that are described in the expected template includes:

if the second network device can capture the second detection packet, and the second detection packet has all the packet features that should be presented by the service flow on the second network device and are described in the expected template, calculating, by the controller, a packet loss rate between the first network device and the second network device according to a quantity of second detection packets captured by the second network device and a quantity of first detection packets generated by the first network device.

A second aspect of this application provides a network device service quality detection apparatus, and the service quality detection apparatus has a function of implementing a behavior of the controller in the foregoing method embodiments. The function may be implemented by hardware, or may be implemented by executing corresponding software by hardware. The hardware or the software includes one or more modules or units corresponding to the function.

In one embodiment, a structure of the apparatus includes a first obtaining unit, a first determining unit, a second obtaining unit, a second determining unit, a generation unit, and a detection unit. These units may perform a corresponding function in the foregoing method example. For details, refer to detailed descriptions in the method example. Details are not described herein again.

In one embodiment, a structure of the apparatus includes a network interface, a processor, a bus, and a memory. The network interface is configured to communicate and interact with another device in communications system. The processor is configured to support the apparatus in performing a corresponding function in the foregoing method. The memory is coupled to the processor, and the memory stores a program instruction and data that are necessary for the apparatus.

Using the solution provided in this application, a service function feature of a network device is built into a service template as a fixed part. An operation and maintenance engineer does not need to learn of a service function feature of each network device, and only needs to provide a flow identifier, deployment information, and the like of a to-be-detected service flow. A controller dynamically deploys a detection point according to the flow identifier and the deployment information of the service flow that are provided by the operation and maintenance engineer and the fixed part of the service template, so as to automatically detect service quality of a network device, and reduce operation and maintenance complexity and difficulties.

DESCRIPTION OF EMBODIMENTS

Figure 1:
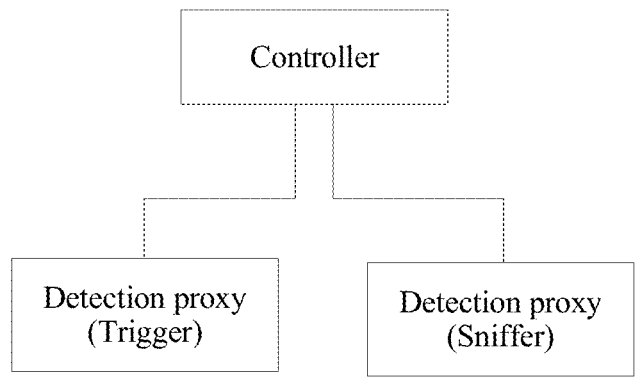
FIG. 1 is a schematic diagram of a system to which a network device service quality detection method is applied according to an embodiment of this application.

The following explains and describes some terms in this application.

A "general template" is a general architecture template that is applicable to OAM of all services, and is used to describe a structure of a service function feature. For example, the service function feature may be represented using an input packet feature and an output packet feature, and input and output are packet directions. Therefore, the service function feature may be described using a packet direction and a packet feature. The packet feature usually includes various fields, and each field has characteristics such as a name, an offset, a length, and a value. Therefore, the packet feature is a list that includes concepts such as a name, an offset, a length, and a value. In conclusion, abstract elements of the service function feature may be the packet direction and the list that includes the concepts such as a name, an offset, a length, and a value. It should be noted that, the packet direction and a field name are not necessary elements. That is, the service function feature may be represented using only a list that includes concepts such as an offset, a length, and a value.

An "OAM requirement architecture" is used to define a parameter that needs to be included in an OAM detection scenario, and the parameter includes a detection object, a detection object feature, a detection behavior feature, and the like. The detection object may be a network device, or may be a component in a network device. A network device or a component used as the detection object may be virtual or may be an entity. To facilitate detection, at least one detection point may be configured on a network device or a component. The detection point may be described using a name or an identifier (ID). The detection object feature is a packet feature at the detection point, and therefore may be abstracted as a list that includes a name, an offset, a length, and a value. The detection behavior feature is a detection requirement of a user, and is used to describe a requirement of the user for a quantity of detection times, a detection frequency, a detection time, and a detection type. The detection type includes two parts: function detection and performance detection. Function detection is used to detect whether a network device successfully performs a designated operation on a service flow, and performance detection is used to detect network performance such as a delay, a packet loss rate, bandwidth, and jitter when the network device performs the designated operation.

Once the general template and the OAM requirement architecture are set, the general-purpose template and the OAM requirement architecture may be applied to multiple services. The general template and the OAM requirement architecture include only one architecture, and no specific value is designated. The general template and the OAM requirement architecture may be written in a plurality of forms, for example, may be in a YANG structure of an Extensible Markup Language (xml) format, or may be in another format such as a JSON format.

A "Service template" is a template formed by adding a specific service function feature value based on the general template. Each service type has a particular service function feature. A frequently-used service type includes a firewall service, a load balancer service, a gateway service, and the like. For example, a service type is a VxLAN GW service. A service function type of the VxLAN GW service is to convert a packet of a designated type into a VxLAN packet, for example, convert an Ethernet-Internet Protocol packet or a virtual local area network (VLAN)-IP packet into the VxLAN packet.

"Deployment information of a service flow" is a specific deployment value of a service flow in a particular environment. For example, deployment information of a VxLAN GW service of a tenant may be as follows: An Ethernet-IP packet enters a virtual network interface card (vNIC) 1 of a VxLAN GW and a VxLAN packet is output from a vNIC 2 of the VxLAN GW, to convert the Ethernet-IP packet into the VxLAN packet. A destination IP address in the Ethernet-IP packet before conversion is IP 1, and a VxLAN ID in the VxLAN packet obtained after conversion is a.

"Detection requirement information" is used to designate a specific detection object, a detection object feature, and a detection behavior feature, for example, designate a packet that has a specified feature in a specified module and on which detection is performed, designate whether function detection or performance detection is to be performed, or designate a quantity of detection times within a specified time period.

A "Maintenance template" is used to describe a particular maintenance requirement of a service, and is a template formed by adding specific detection requirement information based on the OAM requirement architecture.

An "Expected template" is a template formed based on a service template with reference to specific deployment information of a service flow and other network information, and may be used to describe a packet feature, of a particular service packet, at each detection point in a particular deployment environment.

A conventional OAM method for a network device can be only used to diagnose network reachability, that is, whether a network connection is normal, a value of a network delay, whether there is a packet loss in a network, and the like, but cannot be used to diagnose service quality of the network device, that is, whether the network device successfully performs a service function of the network device, and performance of the network device in a process of performing the service function of the network device, for example, a value of a delay, and whether there is a packet loss.

Currently, there is no simple and easy-to-use network device service quality detection method, and an operation and maintenance engineer still needs to be familiar with a service function feature of each network device in advance. In addition, for each service flow, the operation and maintenance engineer needs to learn of processing that is to be specifically performed on the service flow by each network device, obtain, by means of analysis, theoretical statuses that the service flow is in when the service flow enters and exits each network device, then manually check one by one actual statuses that the service flow is in when the service flow enters and exits each network device, and compare the theoretical statuses with the actual statuses of the service flow to obtain service quality of each network device. This is excessively difficult and time-consuming work. Each time a new service emerges, a telecommunications operator needs to train the operation and maintenance engineer, and subsequently, the operation and maintenance engineer may further need assistance of a manufacturer service staff of each network device during detection of the service quality of the network device. This increases operation and maintenance difficulties and complexity.

To resolve the problem, this application provides a network device service quality detection method. Using a template, a service function feature of a network device is built into a service template as a fixed part. An operation and maintenance engineer does not need to learn of a service function feature of each network device, and only needs to provide a flow identifier and deployment information that are of a to-be-detected service flow. A controller dynamically deploys a detection point according to the flow identifier and the deployment information of the service flow that are provided by the operation and maintenance engineer and the fixed part of the service template, so as to automatically detect service quality of a network device, and reduce operation and maintenance complexity and difficulties.

The following describes the technical solutions of the present invention with reference to the accompanying drawings and embodiments.

The network device service quality detection method provided in this application may be applied to a system shown in FIG. 1. The system mainly includes two entities. One is a controller, and the other one is a detection proxy. The detection proxy is used to perform a detection operation according to an execution instruction of the controller. Detection proxies may be classified into a trigger and a sniffer according to a performed function, where the trigger performs a packet delivery function, and the sniffer performs a packet capture function.

The controller may be deployed in a centralized manner. That is, one controller dynamically controls a detection behavior of the detection proxy. Alternatively, the controller may be deployed in a distributed manner. That is, a plurality of controllers are deployed in a network, and the plurality of controllers manage the detection proxy in a load balancing manner.

The detection proxy can be deployed on a network device where a service quality of the network device is required to be detected. There are usually a plurality of network devices that need to be detected, and therefore a plurality of sniffers usually need to be deployed. However, only one trigger may be deployed. The detection proxy may be deployed on each network device in advance, or may be deployed, in real time according to a command of the controller when detection needs to be performed, on a network device that needs to be detected.

In this application, a deployment location relationship between the controller and the detection proxy is not limiting as long as the controller and detection proxy meet network reachability. For example, the controller and the detection proxy may be deployed on a same network device, or the controller may be independently deployed on another network device, for example, on a network management device.

The following separately describes functions of the controller, the trigger, and the sniffer.

1. Controller

The controller mainly has the following five functions.

Function 1: Obtain input information related to detection of service quality of a network device.

The input information mainly includes an identifier of a service flow, deployment information of the service flow, and a service function feature corresponding to a service type of the service flow.

The service function feature may be provided by a service developer. After a service function feature of a service type is provided once, the service function feature may be directly used subsequently in all instances that are related to the same service type. The service developer may directly write a service template that includes the service function feature to the controller, or may enter a specific service function feature value into the controller. The controller adds the specific service function feature value based on a general template to form a service template.

The flow identifier of the service flow and the deployment information of the service flow are provided by an operation and maintenance engineer for the controller using an input apparatus or an input interface.

Function 2: Generate an expected template according to the various input information.

The expected template may be used to describe a status that should be presented by a service-related packet at each detection point in a deployment environment of the packet, for example, a packet feature presented by a service packet on each network device on a forwarding path of the service packet.

With reference to a service function feature of a to-be-detected service flow, deployment information that is of the service flow and that is entered by the operation and maintenance engineer, and topology information that is about the service flow and that is obtained from another network module, the controller may obtain a packet feature, of the service flow, at each detection point in a detection range, to form an expected template.

Function 3: Obtain detection requirement information, and determine a specific detection object, a detection object feature, and a detection behavior feature.

The detection requirement information is provided by an operation and maintenance engineer for the controller using an input apparatus or an input interface.

The controller may directly store received detection requirement information, or may fill an OAM requirement architecture with the detection requirement information, and designate a specific value for a parameter defined in the OAM requirement architecture, so as to generate a maintenance template, and to store all detection requirement information using the maintenance template.

The OAM requirement architecture may be provided by an OAM developer, and is applicable to all service types. The OAM developer defines, in the OAM requirement architecture, a parameter required for function detection and required for performance detection, for example, a detection range, a detection time period, and a detection frequency. Specific values of these parameters are provided by the operation and maintenance engineer in a specific instance.

By using the detection requirement information, the operation and maintenance engineer may correspondingly add or delete a detection point according to an actual requirement. For example, if the operation and maintenance engineer only needs to determine whether a network device on a forwarding path has a problem and is not concerned about another network device, the operation and maintenance engineer may instruct, using the detection requirement information, the controller to deploy a detection point only on the network device about which the operation and maintenance engineer is concerned.

In addition, using the detection requirement information, the operation and maintenance engineer may designate the detection object feature according to an actual requirement. For example, to detect whether a protocol conversion function of a VxLAN GW is normal, the operation and maintenance engineer may instruct, using the detection requirement information, to capture a VxLAN packet with a designated inner destination IP address at an egress location of the VxLAN GW, instead of setting a specific detection object feature such as a VxLAN ID. Therefore, subsequently, the controller may compare whether an actual VxLAN ID of the captured VxLAN packet is consistent with a theoretical VxLAN ID described in the expected template, to determine whether a component that is responsible for converting an IP packet into a VxLAN packet in the VxLAN GW is faulty.

Optionally, the operation and maintenance engineer may not provide the detection requirement information. In this case, the controller may use a default setting. For example, by default, each network device on a forwarding path of a service flow is used as a detection object, one or more packet features that should be presented by the service flow at each network device and that are described in the expected template are used as detection object features, and a preset detection frequency, a preset detection time, a preset detection type, and the like are used as detection behavior features.

Function 4: Instruct, according to the expected template, a detection proxy to deploy a detection point, and instruct the detection proxy to execute a detection behavior.

The detection point is a location at which the detection proxy performs a detection operation, and detection points may be classified into a trigger point and a sniffer point. The detection proxy generates a detection packet at the trigger point, and captures a detection packet at the sniffer point. Usually, there is only one trigger point and a plurality of sniffer points. The controller may instruct the detection proxy to deploy a plurality of sniffer points inside a same network device. For example, a server includes components such as a system management program (hypervisor) and a virtual machine (VM). The controller may instruct to deploy a sniffer point on each of an egress and an ingress of these components.

The controller learns, by means of analysis with reference to the expected template and the detection requirement information, that a trigger point should be deployed at which location, a detection packet having which feature should be generated at the trigger point, the detection packet should be generated at the trigger point at which frequency within which time period, and the like. The controller delivers the information obtained by means of analysis to a trigger, to instruct the trigger to deploy the trigger point and generate the detection packet at the trigger point according to a requirement.

In addition, the controller further obtains, by means of analysis, a location at which a sniffer point should be deployed, a feature according to which a detection packet should be captured at the sniffer point, and a time period within which the detection packet should be captured at the sniffer point. The controller delivers the information obtained by means of analysis to a sniffer, to instruct the sniffer to deploy the sniffer point and capture the detection packet according to a requirement.

In embodiments of this application, a detection packet generated by a trigger is a packet in a general format, and has a packet header the same as that of a packet of a to-be-detected service flow, so as to ensure that the detection packet and the to-be-detected service flow can have a same processing path. In addition, a payload of the detection packet carries a field required for an OAM function, and the required field is used to carry information required for the OAM function or instruct the detection point to execute some necessary actions. The trigger does not know or is not concerned about, in advance, fields included in the detection packet, a length of each field, and a value of the field. A control center obtains, by means of analysis according to the expected template, an offset, a length, and a value of each field included in the detection packet, and then delivers the information to the trigger, to instruct the trigger to generate the detection packet according to a designated offset, a designated length, and a designated value. In this way, both detection of various existing services and detection of a subsequent newly emerging service may be compatible with the packet.

Figure 2:
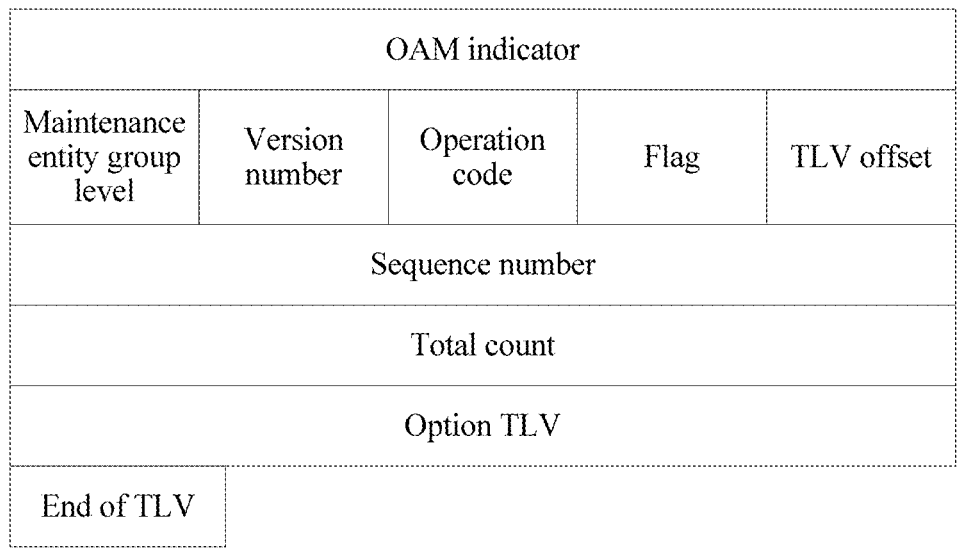
FIG. 2 is a schematic diagram of a payload format of a detection packet according to an embodiment of this application.

A reference payload format of the detection packet is shown in FIG. 2, and may include the following fields: an OAM indicator, an operation code, a flag, a maintenance entity group level, a version number, a sequence number, a total count, a type-length-value offset, an option TLV, and end of TLV.

The OAM indicator is used to indicate that a packet is a detection packet, and different values of the OAM indicator may be corresponding to different services, so that OAM measurement of a plurality of services may be performed simultaneously.

The operation code (opcode) is used to indicate an OAM detection requirement, and different values of the operation code may be corresponding to different detection requirements. A value is used to indicate an item on which a detection point performs performance detection. For example, it may be designed that a length of the opcode is one byte. When a value of the opcode is 00000000, it indicates that the detection point performs only a detection function. When a value of the opcode is 00000001, it indicates that the detection point performs a performance detection of a delay. When a value of the opcode is 00000010, it indicates that the detection point performs a performance detection of a packet loss rate. When a value of the opcode is 00000011, it indicates that the detection point performs performance detection of a delay and a packet loss rate.

In one embodiment, the flag is used to indicate an action is needed to be performed by a detection point on a packet. The action includes at least one of the following: adding a time stamp to a payload of the packet, forwarding the packet to a next-hop network device on a forwarding path, copying the packet and sending the copied packet to a controller, or discarding the packet. For example, the detection point may be instructed to copy the packet, report the copied packet to the controller, and then forward the packet. Some actions are required to be performed by all detection points. For example, usually, all detection points need to copy a packet and report the copied packet to the controller. Some actions may need to be performed only by a particular detection point. For example, usually, only a last detection point needs to report a copied packet to the controller, and then discard an original packet. In a possible implementation, a setting of different flag values is agreed on. For example, it is set that the flag occupies four bits. That a zeroth bit is 1 indicates that all detection points are required to copy and forward a packet. That a second bit is 1 indicates that a last detection point is required to discard a packet, and a priority of a discarding operation is higher than a priority of a forwarding operation.

The maintenance entity group level (MEL) is used to indicate a maintenance level of a packet. For example, it may be specified that only a network device whose device maintenance level is higher than the maintenance level of the packet has a right to parse the packet; if the device maintenance level of the network device is not higher than the maintenance level of the packet, the packet is transmitted directly and transparently.

The version number is used to indicate a protocol version number of a packet.

The sequence number is used to identify a packet generation sequence at a trigger point. For example, the trigger point sets a sequence number field of a first generated detection packet to 1, sets a sequence number field of a second generated detection packet to 2, and by analogy, sets a sequence number field of an $n^{th}$ generated detection packet to n. A network device may determine, using the sequence number, whether out-of-order detection packets occurred. If a network device receives a detection packet whose sequence number is 2 before receiving a detection packet whose sequence number is 1, the network device may determine that out-of-order occurs. In addition, the sequence number field may be further used to calculate a packet loss rate and a delay.

The total count is used to indicate a predicted quantity of detection packets that are to be generated by a trigger point in current OAM detection. The total count field may be used to calculate a packet loss rate.

The type-length-value (TLV) offset is used to indicate a quantity of bytes that are separated from a first byte of a packet to find a TLV.

The option TLV is used for function extension. For example, a user may add one or more TLVs to a packet according to an extra requirement, to perform a function required by the user.

The end of TLV field is used to identify an end of the TLV.

It should be noted that the OAM indicator field and the flag field are necessary fields in a detection packet, because a detection packet generated by the trigger point may affect a network outside a detection path. Therefore, the detection packet needs to carry the OAM indicator field and the flag field, so that the sniffer point knows that the detection packet needs to be discarded, thereby avoiding interference caused to a normal service flow. Another field may be flexibly added or deleted according to a specific use environment. The controller only needs to designate an offset, a length, and a value and notify the trigger of the offset, the length, and the value.

Function 5: Output, according to a detection packet returned by a sniffer, a service quality detection result of a network device on a path through which the detection packet passes.

If the controller sends, to a sniffer point, only some packet features that should be presented by a to-be-detected service flow at the sniffer point and that are described in the expected template, to instruct the sniffer point to capture a detection packet according to the features, after the controller receives a detection packet returned by the sniffer point, the controller further needs to compare the detection packet returned by the sniffer point with the expected template. If the expected template and the detection packet are completely consistent, the controller determines that a function at the sniffer point is normal; or if the expected template and the detection packet are not completely consistent, the control may obtain, by means of analysis according to inconsistency between the expected template and the detection packet, a reason that causes a fault of the detection packet, and locate a network device and a component that may be faulty.

If the controller sends, to a sniffer point, all packet features that should be presented by a to-be-detected service flow at the sniffer point and that are described in the expected template, to instruct the sniffer point to capture a detection packet according to all the features, after the controller receives a detection packet returned by the sniffer point, the controller does not need to compare whether the detection packet returned by the sniffer point is consistent with the expected template, and may directly determine that a function at the sniffer point is normal.

2. Trigger

The trigger is a type of detection proxy, and can have the following two functions.

Function 1: Interact with a controller, and receive an instruction delivered by the controller, where the instruction includes a trigger point feature, a feature of a detection packet that needs to be generated, a detection behavior feature, and the like.

Function 2: Generate a detection packet with a designated feature at a designated trigger point according to a designated detection action feature and the instruction delivered by the controller.

The trigger may be applied to a scenario in which no user can cooperate in detection, so that a detection packet is generated, and a sniffer captures a detection packet that accords with a particular packet feature. When a user can cooperate in detection, a trigger may be not required.

3. Sniffer

The sniffer is a type of detection proxy, and can have the following three functions.

Function 1: Interact with a controller, and receive an instruction delivered by the controller, where the instruction includes a sniffer point feature, a feature of a detection packet that needs to be captured, a detection behavior feature, and the like.

Function 2: Capture a detection packet with a designated feature at a designated detection point according to a designated detection action feature and the instruction delivered by the controller.

Function 3: Send the captured detection packet to the controller.

Optionally, the controller may deliver an expected template to the sniffer or another function entity. The sniffer or the another function entity compares the detection packet captured by the sniffer with the expected template, to generate a service quality detection result of a network device on a path through which the detection packet passes, and then reports the detection result to the controller.

Figure 3:
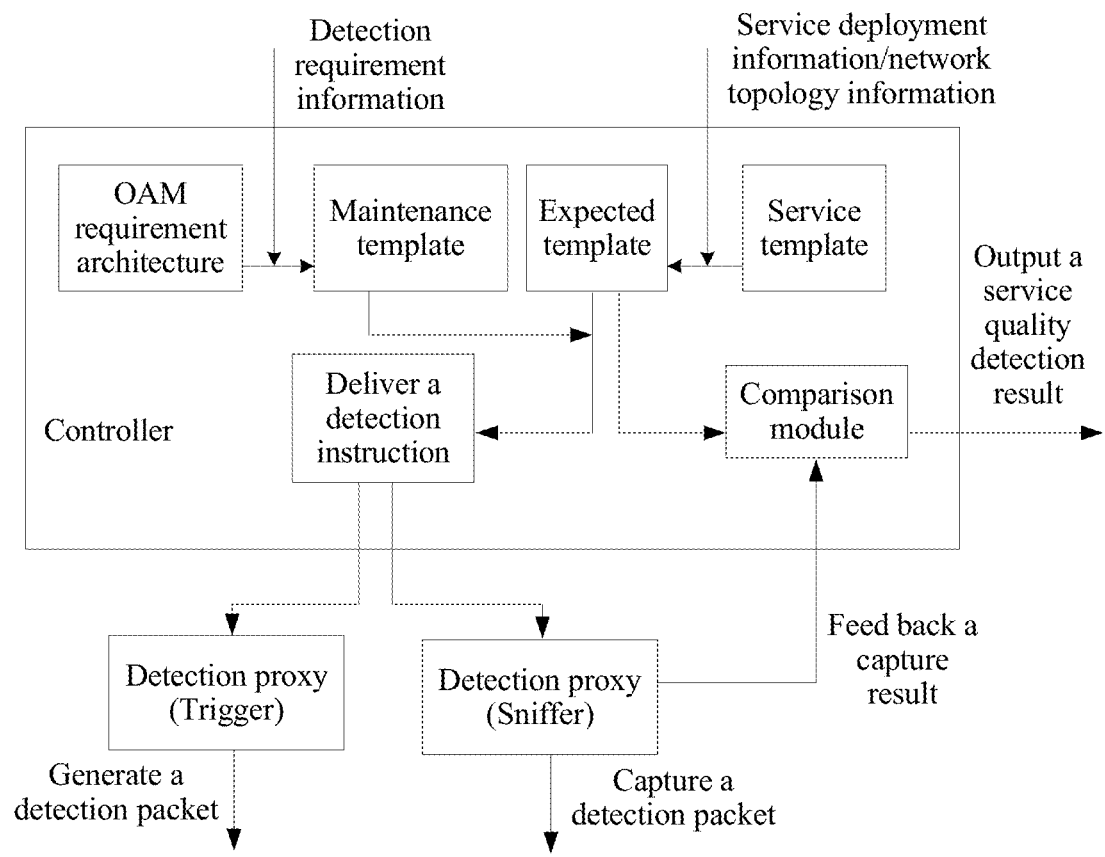
FIG. 3 is a schematic diagram of a network device service quality detection process according to an embodiment of this application.

According to the foregoing descriptions of functions of the controller and the detection proxy, a network device service quality detection process may be shown in FIG. 3. A controller obtains a service template that is provided by a service developer and that includes a service function feature, and generates an expected template based on the service template with reference to a flow identifier of a service flow and deployment information of the service flow that are provided by an operation and maintenance engineer and network topology information that is provided by another network module and that is in a service deployment environment. In addition, the controller generates a maintenance template based on an OAM requirement architecture provided by an OAM developer and with reference to detection requirement information provided by the operation and maintenance engineer. Then the controller obtains, with reference to the maintenance template and the expected template, a detection point feature, a structure of a detection packet that needs to be generated and a structure of a detection packet that needs to be captured, a detection behavior feature, and the like, and delivers the information to the detection proxy; controls a trigger to generate a detection packet with a designated feature at a designated detection point according to a designated detection behavior feature; controls the sniffer to capture a detection packet with a designated feature at a designated detection point according to a designated detection behavior feature; and compares the expected template with a capture result fed back by the sniffer, to obtain a service quality detection result of a network device on a path through which the detection packet passes.

Optionally, the service function feature and the OAM requirement architecture in FIG. 3 may be stored in one template file, or may be separately stored in different template files. Correspondingly, the maintenance template and the expected template may be integrated into one template file, or may be separately and independently stored.

It should be noted that the service developer may provide a service function feature of a service in a template file form or in another form. For example, the service developer fills, with a service function feature of a service, a web page input box provided by the controller, and the controller enters the service function feature based on a general template, to generate a service template specific to the service.

Figure 4:
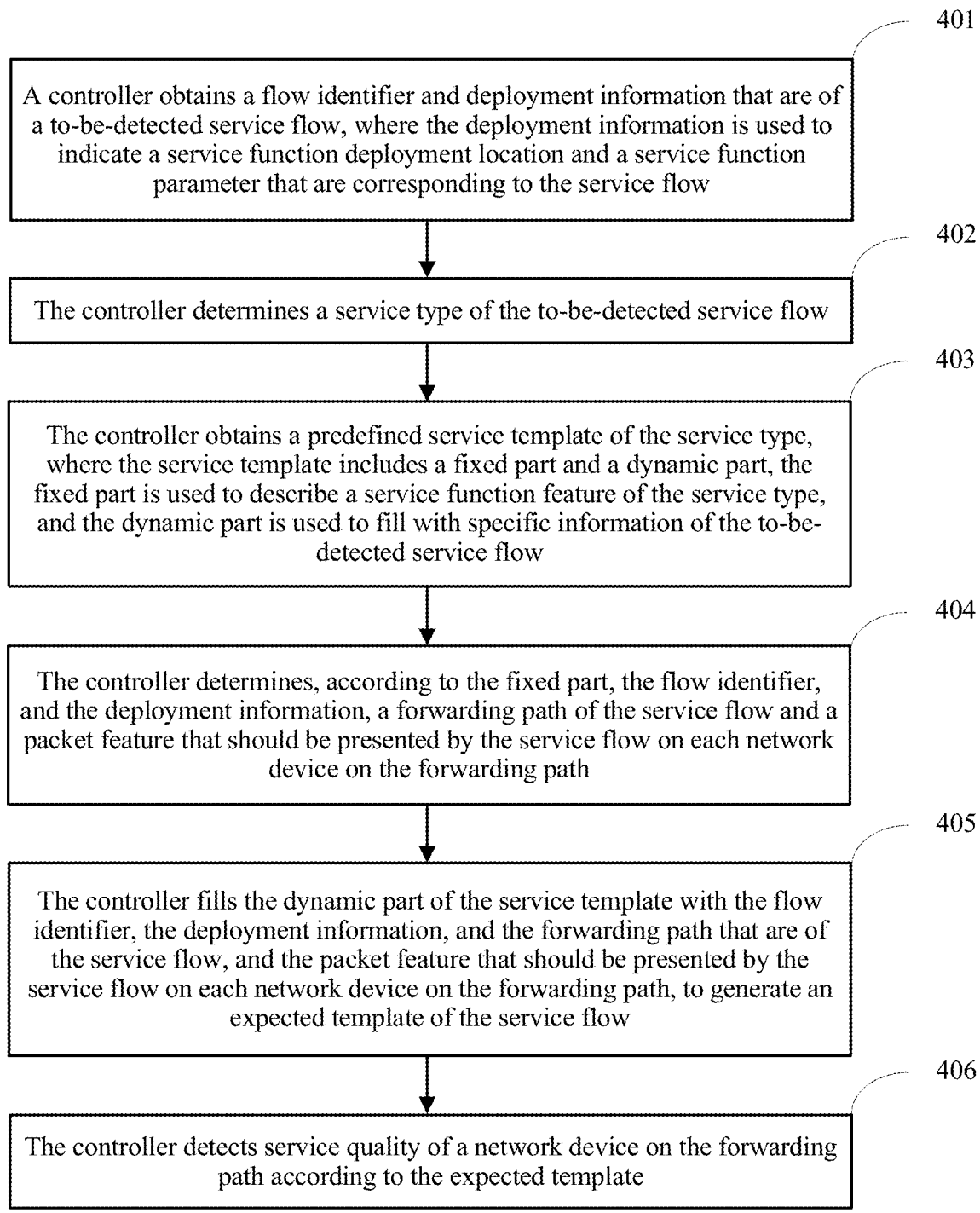
FIG. 4 is a flowchart of a network device service quality detection method according to an embodiment of this application.

Based on the network device service quality detection system provided above, this application further provides a network device service quality detection method. As shown in FIG. 4, the method includes the following operations.

Operation 401: A controller obtains a flow identifier and deployment information that are of a to-be-detected service flow, where the deployment information is used to indicate a service function deployment location and a service function parameter corresponding to the service flow.

A Transmission Control Protocol (TCP) flow is used as an example, and a flow identifier of the TCP flow may be a quintuple of the TCP flow. A VxLAN flow is used as an example, and a flow identifier of the VxLAN flow may be a quintuple and a VxLAN identifier of the VxLAN flow.

Operation 402: The controller determines a service type of the to-be-detected service flow.

Operation 403: The controller obtains a predefined service template of the service type, where the service template includes a fixed part and a dynamic part, the fixed part is used to describe a service function feature of the service type, and the dynamic part is used to fill with specific information of the to-be-detected service flow The following describes the fixed part and the dynamic part of the service template using a service template of a VxLAN GW service as an example. A function of the VxLAN GW service is to convert an Ethernet-IP packet into a VxLAN packet. To save space, only some code in the service template of the VxLAN GW service is excerpted in the following, and the code uses a YANG structure of an XML format.

```
<name>ip-2-vxlan</name> --------------------1
<packet-features>
<packet-feature>
<point>***</point>---------------------2
<direction>in</direction> --------------3
<packet>
<type>Ethernet-ip-packet</type> ---------------------4
<src-ip>IPsrc</src-ip> ---------------------------------5
<dst-ip>IPdst</dst-ip> ---------------------------------6
</packet>
</packet-feature>
<packet-feature>
<point>***</point>---------------------7
<direction>out</direction>-------------8
<packet>
<type>vxlan-packet</type>----------------------------9
<field>
    <name optional>vxlan_id</ name >
    <offset unit=bit>352</offset>
    <length unit=bit>24</length>
    <value>***</value>------------------10
</field>
```

```
      ... ...
      <detect-point>
        <name>***</name>-------------------------11
        <features>
        <feature>
        <offset>***</offset>---------------12
        <length>***</length>---------------13
        <value>****</value>----------------14
        </feature>
        </features>
      </detect-point>
      ... ...
```

Here, 1, 3, 4, 8, and 9 are fixed parts of the service template, and 2, 5, 6, 7, and 10 to 14 are dynamic parts of the service template. Specifically, 1 defines a name of a service type corresponding to the service template, and the name of the service type represents that the function of the VxLAN GW service is to convert the Ethernet-IP packet into the VxLAN packet. The controller may conveniently find a to-be-used service template according to the name of the service type. 3, 4, 8 and 9 define a service function feature of the service template, and the service function feature represents that a packet that enters an ingress of a VxLAN GW is the Ethernet-IP packet, and a packet that is output from an egress of the VxLAN GW is the VxLAN packet. 2 and 7 are separately filled with a service deployment location of a to-be-detected service flow, that is, an ingress and an egress of the service flow that are on the VxLAN GW. 5, 6, and 10 are separately filled with a service function parameter of the to-be-detected service flow, that is, a source IP address and a destination IP address of the service flow before conversion and a VxLAN ID obtained after conversion. 11 is filled with a name of a detection point on a forwarding path of the to-be-detected service flow. 12 to 14 are separately filled with a packet feature that should be presented by the to-be-detected service flow at the detection point. The packet feature may be defined using an offset, a length, and a value.

Operation 404: The controller determines, according to the fixed part, the flow identifier, and the deployment information, a forwarding path of the service flow and a packet feature that should be presented by the service flow on each network device on the forwarding path.

For example, the controller may determine two endpoints of a forwarding path of a service flow according to a flow identifier of the service flow, then obtain, by means of querying, a topology in a range between the two endpoints and a flow table of each network device in the topology, and obtain, based on the topology and the flow table obtained by means of querying and with reference to a service deployment location in deployment information of the service flow, each network device on the forwarding path of the service flow, an egress and an ingress of each network device through which the service flow passes, an egress and an ingress of an internal component of each network device through which the service flow passes, and the like. Then, based on the obtained flow table and the forwarding path with reference to a fixed part of a service template and a service function parameter in the deployment information of the service flow, the controller may obtain a packet feature that should be presented by the service flow at each of the egress and the ingress of each network device on the forwarding path of the service flow and a packet feature that should be presented by the service flow at each of the egress and the ingress of the internal component of each network device.

Operation 405: The controller fills the dynamic part of the service template with the flow identifier, the deployment information, and the forwarding path that are of the service flow, and the packet feature that should be presented by the service flow on each network device on the forwarding path, to generate an expected template of the service flow.

An example of the expected template is shown by the following code. In the following code, 1 to 12 represent filled-in specific information of a service flow, 1-5 represent a flow identifier and deployment information that are of the service flow, 6 represents a detection point on a forwarding path of the service flow, and 7 to 12 represent a packet feature, of the service flow, at the detection point.

```
      <name>ip-2-vxlan</name>
      <packet-features>
        <packet-feature>
          <point>vNIC2</point>-------------------1
      <direction>in</direction>
          <packet>
      <type>ethernet-ip-packet</type>
      <src-ip>IPB</src-ip>-----------------2
      <dst-ip>IPA</dst-ip>-----------------3
      </packet>
      </packet-feature>
      <packet-feature>
      <point>vNIC1</point>--------------------4
          <direction>out</direction>
      <packet>
      <type>vxlan-packet</type>
      <field>
          <name optional>vxlan_id</ name >
            <offset unit=bit>352</offset>
            <length unit=bit>24</length>
            <value>a</value>------------------5
          </field>
      ... ...
      <detect-point>
      <name>NIC2</name>----------------------6
        <features>
          <feature>
            <offset unit=byte>24</offset>----------------------7
      <length unit=byte>4</length>----------------------8
      <value>IPA</value>----------------------9
          </feature>
          <feature>
            <offset unit=byte>28</offset>----------------------10
      <length unit=byte>4</length>----------------------11
      <value>IPB</value>----------------------12
          </feature>
        </features>
      </detect-point>
      ... ...
```

Operation 406: The controller detects service quality of a network device on the forwarding path according to the expected template.

Optionally, an implementation process in which the controller detects the service quality of the network device on the forwarding path according to the expected template may be as follows.

First, the controller instructs, according to the expected template, a first network device on the forwarding path to generate a first detection packet, and instructs, according to the expected template, the first network device to forward the first detection packet along the forwarding path. In addition, the controller instructs, according to the expected template, a second network device on the forwarding path to capture a second detection packet. The second detection packet can be a packet that is obtained after the first detection packet is forwarded to and has reached the second network device, and the second detection packet has at least one packet feature that should be presented by the service flow on the second network device and that is described in the expected template.

Then, the controller determines service quality of a network device between the first network device and the second network device on the forwarding path according to whether the second network device can capture the second detection packet and whether the second detection packet has all packet features that should be presented by the service flow on the second network device and that are described in the expected template.

Specifically, the controller may deploy a trigger on the first network device, and instruct, using the trigger, the first network device to generate the first detection packet. In addition, the controller may deploy a sniffer on the second network device, and instruct, using the sniffer, the second network device to capture the second detection packet.

Optionally, before the controller instructs the first network device on the forwarding path to generate the first detection packet, the controller may further obtain detection requirement information of the service flow. The detection requirement information includes a detection range, a detection time period, and a detection frequency, and the detection range includes at least one to-be-detected network device on the forwarding path. For example, a forwarding path of a service flow includes five network devices A, B, C, D, and E. A detection range of the service flow may be three consecutive network devices B to D, or may be four inconsecutive network devices A, B, D, and E.

Correspondingly, according to the detection range, the controller may use a network device, on the forwarding path, that appears first in the detection range as the first network device; and use each network device in the detection range on the forwarding path as the second network device, or use each network device other than the first network device in the detection range on the forwarding path as the second network device.

Subsequently, the controller may instruct the first network device on the forwarding path, that is, the network device that appears first in the detection range, to generate at least one first detection packet according to the detection frequency within the detection time period; and instruct the second network device, that is, each network device in the detection range or each network device other than the first network device in the detection range, to capture the second detection packet within the detection time period.

Optionally, if the controller cannot obtain the detection requirement information, the controller may consider by default that a network device that appears first on the determined forwarding path is the first network device, and consider by default that each network device on the determined forwarding path is the second network device.

Optionally, a packet header of the first detection packet is the same as a packet header of a packet in the service flow, so as to ensure that a forwarding path of the first detection packet is the same as the forwarding path of the service flow.

A payload of the first detection packet and that of the second detection packet each may include a first field and a second field. The first field is used to indicate that a packet is a detection packet. The second field is used to indicate an action that needs to be performed on a packet by a network device through which the packet passes. The action includes at least one of the following: adding a time stamp to a payload of the packet, forwarding the packet to a next-hop network device on the forwarding path, copying the packet and sending the copied packet to the controller, or discarding the packet.

The first field herein is equivalent to the OAM indicator field in FIG. 2, and the second field is equivalent to the flag field in FIG. 2. The payload of the first detection packet and that of the second detection packet each may include more or fewer fields than those included in the packet format shown in FIG. 2.

Optionally, the packet feature may be represented by an offset, a length, and a value in a packet that are of a field included in the packet. For example, a packet feature of an IP packet may be represented as follows: A value of a field whose offset is 24 bytes and whose length is four bytes is IP A, and a value of a field whose offset is 28 bytes and whose length is four bytes is IP B.

In some embodiments of this application, the packet feature is represented using an offset, a length, and a value. In this way, various newly emerging services may be compatible with the packet feature. Certainly, a packet well known in the industry may also be represented using a specific field name. For example, a packet feature of an IP packet may be represented as follows: A destination IP address is IP A, and a source IP address is IP B.

When the controller detects the service quality of the network device between the first network device and the second network device on the forwarding path, the controller performs both function detection and performance detection. Function detection is used to detect whether a network device successfully performs a designated operation on the service flow, and performance detection is used to detect network performance such as a delay, a packet loss rate, bandwidth, and jitter when the network device performs the designated operation.

Optionally, when function detection is performed, if the second network device can capture the second detection packet, and the second detection packet has all the packet features that should be presented by the service flow on the second network device and that are described in the expected template, the controller determines that all network devices between the first network device and the second network device on the forwarding path have a normal function; or if the second network device can capture the second detection packet, but the second detection packet does not have all the packet features that should be presented by the service flow on the second network device and that are described in the expected template, the controller determines that at least one network device between the first network device and the second network device on the forwarding path is faulty; or if the second network device does not capture the second detection packet, the controller determines that at least one network device between the first network device and the second network device on the forwarding path is faulty.

It should be noted that the described network device between the first network device and the second network device on the forwarding path include the first network device and the second network device.

In some embodiments of this application, the controller may send, to the second network device, some packet features that should be presented by the to-be-detected service flow on the second network device and that are described in the expected template. In this case, subsequently, the second network device may capture a matched second detection packet according to the features. When the controller compares the second detection packet captured by the second network device with all the packet features that should be presented by the to-be-detected service flow on the second network device and that are described in the expected template, if the controller finds that the second detection packet captured by the second network device and all the packet features that should be presented are not completely consistent, the controller may obtain, by means of analysis according to inconsistency between the second detection packet and all the packet features, a reason that causes a fault of the second detection packet, and locate a network device and a component that may be faulty.

For example, it is assumed that after a service flow is processed at a VxLAN GW, all packet features that should be presented by the service flow at an egress of the VxLAN GW include: a value of a field whose offset is 44 bytes and whose length is two bytes is a (a represents a VxLAN identifier of a VxLAN packet after an IP packet is converted into the VxLAN packet), a value of a field whose offset is 34 bytes and whose length is two bytes is 4789, a value of a field whose offset is 72 bytes and whose length is four bytes is IP A, and a value of a field whose offset is 76 bytes and whose length is four bytes is IP B. The controller may send only some packet features to the VxLAN GW. For example, the controller may instruct the VxLAN GW to capture, at the egress, a VxLAN packet whose inner destination IP address is IP A, instead of setting other conditions such as a condition that the VxLAN ID is "a". If an error occurs in conversion performed at the VxLAN GW, a packet whose VxLAN ID is "a" may not be captured at the egress of the VxLAN GW, but a packet whose ID is "b" may be captured. The controller may determine, by means of analysis, that a component that is in the VxLAN GW and that is responsible for converting the IP packet into the VxLAN packet is faulty.

Certainly, in embodiments of 1this application, the controller may send, to the second network device, all the packet features that should be presented by the to-be-detected service flow on the second network device and that are described in the expected template. In this case, subsequently, if the second network device captures a matched second detection packet, the controller may directly determine that a network device between the first network device and the second network device on the forwarding path functions normally; or if the controller does not capture a matched second detection packet, the controller may directly determine that at least one network device between the first network device and the second network device on the forwarding path is faulty. Therefore, an operation of comparing the second detection packet captured by the second network device with the packet feature described in the expected template may be omitted.

Optionally, when performance detection of a delay is performed, in a possible implementation, the payload of the first detection packet and that of the second detection packet each further includes a sequence number that is used to identify a packet generation sequence, that is, the sequence number field in FIG. 2. A sequence number included in the second detection packet is the same as a sequence number included in the first detection packet. Therefore, the controller may determine, according to the sequence number, that the second detection packet to be a detection packet that is obtained after the first detection packet has been forwarded to and has reached the second network device. In addition, the first detection packet and the second detection packet instruct, using the second field, a network device on the forwarding path to add a time stamp to the payload of the first detection packet or the second detection packet when forwarding the first detection packet or the second detection packet. Correspondingly, if the second network device can capture the second detection packet, and the second detection packet has all the packet features that should be presented by the service flow on the second network device and that are described in the expected template, the controller may calculate a delay between the first network device and the second network device according to a time stamp in the first detection packet and a time stamp in the second detection packet.

Optionally, when performance detection of a delay is performed, in one embodiment, the first detection packet and the second detection packet instruct, using the second field, a network device to retain an existing time stamp in the payload of the packet when forwarding the first detection packet or the second detection packet, and add a new time stamp to the payload of the first detection packet or the second detection packet. Correspondingly, if the second network device can capture the second detection packet, and the second detection packet has all the packet features that should be presented by the service flow on the second network device and that are described in the expected template, the controller may calculate a delay between the first network device and the second network device according to a plurality of time stamps in the second detection packet.

Optionally, when performance detection of a packet loss rate is performed, in one embodiment, the controller instructs the first network device on the forwarding path to generate a plurality of first detection packets. A quantity of generated first detection packets may be carried in the payload of the first detection packet and that of the second detection packet, such as the total count field in FIG. 2. Alternatively, the first network device may report a quantity of generated first detection packets to the controller using signaling. Alternatively, the first network device may generate a preset quantity of first detection packets on which the first network device and the controller agree. Correspondingly, if the second network device can capture the second detection packet, and the second detection packet has all the packet features that should be presented by the service flow on the second network device and that are described in the expected template, the controller may calculate a packet loss rate between the first network device and the second network device according to a quantity of second detection packets captured by the second network device and a quantity of first detection packets generated by the first network device.

To describe the technical solution of this application more clearly, the following further describes the foregoing technical solution using two embodiments. It should be noted that the two embodiments are merely two implementations of this application, and constitutes no limitation on this application.

Embodiment 1

Figure 5:
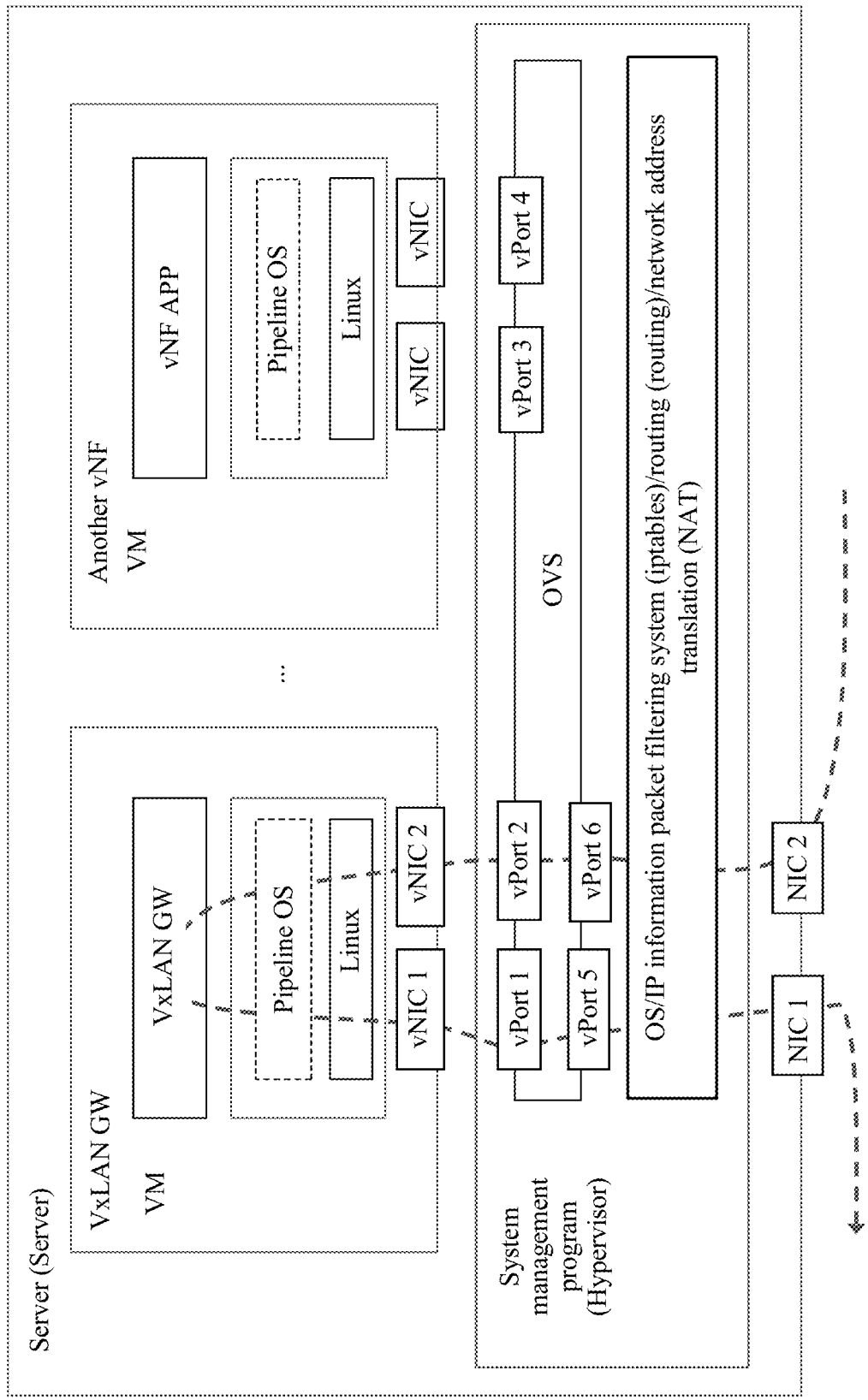
FIG. 5 is a schematic deployment diagram of a VxLAN GW service according to an embodiment of this application.

Deployment of a VxLAN GW service of a tenant is shown in FIG. 5 according to one embodiment. Deployment information of a service flow of the tenant is as follows: VxLAN conversion is performed on an IP packet that enters a vNIC 2 port and whose destination IP address is IP A, and a VxLAN packet whose VxLAN ID is "a" is output from a vNIC 1 port.

It is assumed that the VxLAN GW service of the tenant is disconnected. It is found, by means of initial detection, that a fault occurs in a server shown in FIG. 5. The server includes a plurality of components, such as a NIC, an Open vSwitch (OVS), and a VxLAN GW VM. A fault of any component in the server may cause disconnectivity of the VxLAN GW service of the tenant.

Figure 6:
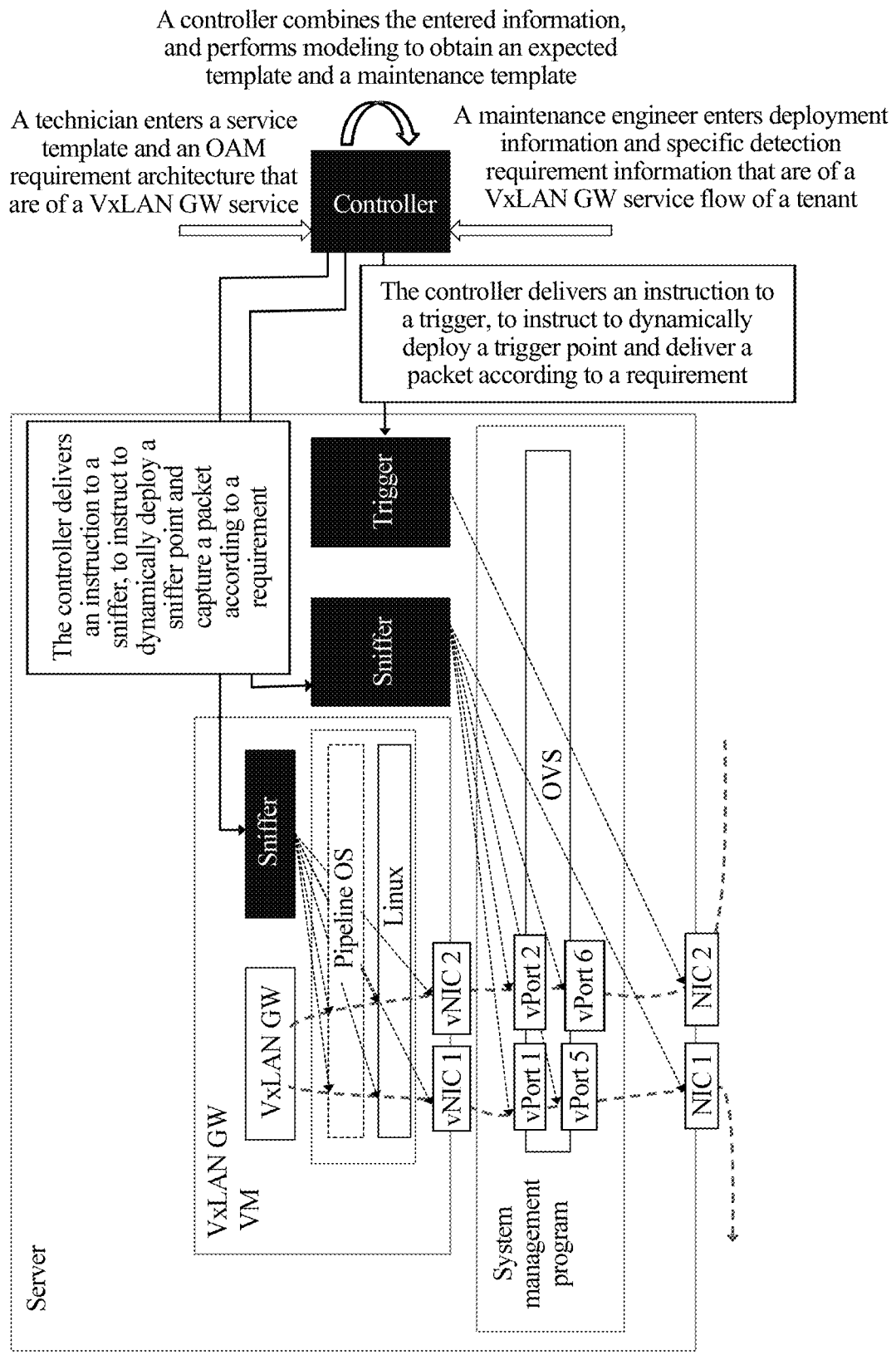
FIG. 6 is a schematic deployment diagram of detecting a VxLAN GW service according to an embodiment of this application.

To locate a component that is faulty in the server, a detection point deployment manner is shown in FIG. 6 according to one embodiment. Example implementation operations are as follows.

Operation 1: A controller obtains a service template of the VxLAN GW service and an OAM requirement architecture of the VxLAN GW service.

The service template of the VxLAN GW service and the OAM requirement architecture of the VxLAN GW service may be provided by a technician.

For a format of the service template of the VxLAN GW service, refer to the example taken to explain the service template in operation 403. Details are not described herein again.

The following describes the OAM requirement architecture of the VxLAN GW service using a segment of code. The code uses a YANG structure of an XML format.

```
<oam-requirements>
  <oam-requirement>
    <name>ip-2-vxlan-detect</name>
    <types>-------------------------------------1
<option>function</option>
<option>performance</option>
</types>--------------------------------------2
<detect-points>-------------------------------3
    <detect-point>
      <name>***</name>
      <features>
        <feature>
          <offset>***</offset>
          <length>***</length>
          <value>****</value>
        </feature>
      </features>
    </detect-point>
</detect-points>----------------------------------4
    <detect-actions>-------------------------5
      <detect-time>
        <begin-time>***</begin-time>
        <end-time>***</end-time>
      </detect-time>
      <detect-times>***</detect-times>
    </detect-actions>
  </oam-requirement>
</oam-requirements>----------------------------6
```

Here, 1 and 2 provide detection types, including function detection and performance detection, and an operation and maintenance engineer may select a detection type in this framework. 3 and 4 provide a structure description of a detection point in a detection range and a detection point feature, and the detection point feature may be represented using an offset/a length/a value. 5 and 6 provide a structure of a detection behavior feature, including a detection time period requirement, a detection frequency requirement, and the like.

Operation 2: The controller obtains deployment information and specific detection requirement information that are of a VxLAN GW service flow of the tenant.

For example, in FIG. 5, a service deployment location of the service flow of the tenant may be the vNIC 2 and the vNIC 1.

A service function parameter may be as follows: A destination IP address of an input packet is IP A, a source IP address of the input packet is IP B, and a VxLAN ID value of an output packet is "a".

A detection type may be a function detection type.

A detection range may be from a NIC 2 to a NIC 1. That is, all components in the server are detected.

A detection time period may be as follows: The NIC 2 generates a detection packet within a time period from 2015-11-20-24:00 to 2015-11-21-6:00, and another detection point other than the NIC 2 in the detection range captures a detection packet within a time period from 2015-11-20-24:00 to 2015-11-21-6:05. It should be noted that the time period within which the other detection point captures a detection packet needs to include the time period within which the NIC 2 generates a detection packet.

A detection frequency may be as follows: The NIC 2 generates one detection packet every minute on average.

Operation 3: The controller obtains, from another network component, topology information and flow table information in a deployment environment of the VxLAN GW service flow of the tenant, and obtains a forwarding path of the service flow of the tenant by combining the information obtained in the foregoing two operations.

For example, in FIG. 5, the forwarding path of the service flow of the tenant is as follows: The service flow enters the server from the NIC 2, enters the vNIC 2 by passing through the OVS, and is sent from the NIC 1 by passing through the vNIC 1 and the OVS after the service flow is converted at a VxLAN GW. An IP address of the vNIC 1 is IP 11, and a spanning port of the vNIC 1 in the OVS is a virtual port (vPort) 1; an IP address of the vNIC 2 is IP 22, and a spanning port of the vNIC 2 in the OVS is a vPort 2; an IP address of the NIC 1 in the server is IP 1, and a spanning port of the NIC 1 in the OVS is a vPort 5; and an IP address of the NIC 2 is IP 2, and a spanning port of the NIC 2 in the OVS is a vPort 6.

Operation 4: The controller combines the information obtained in the foregoing three operations to obtain, by means of analysis, a packet feature of the service flow of the tenant when the service flow passes through each component in an OAM detection range, so as to obtain an expected template and a maintenance template.

For example, in FIG. 5, before the service flow of the tenant enters the VxLAN GW, a packet feature on each of the NIC 2, the vPort 6, the vPort 2, and the vNIC 2 is as follows: A value of a field whose offset is 24 bytes and whose length is four bytes is IP A, and a value of a field whose offset is 28 bytes and whose length is four bytes is IP B. That is, a packet on each of the NIC 2, the vPort 6, the vPort 2, and the vNIC 2 is an IP packet whose destination IP address is IP A.

After the service flow of the tenant passes through the VxLAN GW, a packet feature on each of the vNIC 1, the vPort 1, the vPort 5, and the NIC 1 is as follows: A value of a field whose offset is 44 bytes and whose length is two bytes is "a", a value of a field whose offset is 32 bytes and whose length is two bytes is 4789 (which represents a destination port), a value of a field whose offset is 72 bytes and whose length is four bytes is IP A, and a value of a field whose offset is 76 bytes and whose length is four bytes is IP B. That is, a packet on each of the vNIC 1, the vPort 1, the vPort 5, and the NIC 1 is a VxLAN packet whose VxLAN ID is "a", whose inner destination IP address is IP A, whose inner source IP address is IP B, and whose destination port is 4789.

A detection point in FIG. 6 may be added or deleted as required. For example, if the VxLAN GW to be delimited has a problem, and no other components are of concern, only detection points on the vNIC 1 and the vNIC 2 may be retained. If another component such as a pipeline open system (OS) also needs to be located, a detection point may be added inside the pipeline OS. A case for another component is similar to this case.

Operation 5: The controller delivers an instruction to a trigger in the server.

After obtaining the expected template and the maintenance template, the controller learns, by means of analysis, which detection point should be triggered to generate which packet according to which frequency within which time period, and delivers the information to the trigger.

In this embodiment, the controller delivers the following information to the trigger:

(1) One detection packet is generated on the NIC 2 every other minute from 2015-11-20-24:00 to 2015-11-21-6:00.

(2) The generated detection packet is an Ethernet-IP packet whose destination IP address is IP A and whose source IP address is IP B.

(3) Optionally, if there is no identifier in a to-be-generated detection packet to distinguish a current packet and a next packet, for example, an identifier may be used in an IP packet to distinguish a current packet and a next packet, but no field in an Ethernet packet is used to distinguish a current packet and a next packet, it may be required that a payload of the to-be-generated detection packet carries a sequence number field and other fields, such as a time or a mark.

Operation 6: The controller delivers an instruction to a sniffer in the server.

After obtaining the expected template and the maintenance template, the controller learns, by means of analysis, that a detection packet should be captured at which point within which time period and that a detection packet is captured at each point according to which feature, and then delivers the information to the sniffer.

In this embodiment, the controller delivers the following information to the sniffer:

(1) An Ethernet-IP packet is captured on each of the vPort 6, the vPort 2, and the vNIC 2, and a packet feature is as follows: A value of a field whose offset is 24 bytes and whose length is four bytes is IP A, and a value of a field whose offset is 28 bytes and whose length is four bytes is IP B.

(2) A VxLAN packet is captured on each of the vNIC 1, the vPort 1, the vPort 5, and the NIC 1, and a packet feature is as follows: A value of a field whose offset is 44 bytes and whose length is two bytes is "a", a value of a field whose offset is 34 bytes and whose length is two bytes is 4789, a value of a field whose offset is 72 bytes and whose length is four bytes is IP A, and a value of a field whose offset is 76 bytes and whose length is four bytes is IP B.

(3) A capture time period is from 2015-11-20-24:00 to 2015-11-21-6:05.

(4) After capture ends, each detection point reports, to the controller, a detection packet captured by the detection point.

(5) Optionally, it may be required that each detection point records a sequence number in the captured detection packet, to determine whether out-of-order processing has occurred.

Operation 7: The sniffer dynamically deploys a sniffer point according to the instruction, and performs a packet capture behavior.

After receiving the instruction of the controller, the sniffer parses the instruction, and deploys a sniffer point on each of the vPort 6, the vPort 2, the vNIC 2, the vNIC 1, the vPort 1, the vPort 5, and the NIC 1 according to the instruction. The sniffer point captures, within a particular time period according to the instruction, a packet that accords with a feature.

Operation 8: The trigger dynamically deploys a trigger point according to the instruction, and sends a detection packet.

After receiving the instruction of the controller, the trigger parses the instruction, and deploys a trigger point on the NIC 2 according to the instruction. The trigger point generates, within a particular time period according to the instruction, a detection packet that accords with a feature.

Operation 9: The sniffer reports a detection packet captured at the sniffer point.

Operation 10: The controller compares a packet feature of the detection packet captured at the sniffer point with a packet feature described in the expected template, and outputs a fault delimiting and locating result.

An implementable method may be as follows.

(1) The controller matches, according to a sequence number in a captured detection packet, detection packets with a same sequence number and sequences of sniffer points through which the detection packets pass, to form a packet chain, and packet statuses that a packet with a sequence number is in when the packet passes through different sniffer points may be learned from the packet chain.

(2) The controller compares actual packet features at different sniffer points in the packet chain with theoretical packet features in the expected template that are corresponding to the sniffer points. If an actual packet feature at a sniffer point does not accord with that in the expected template, it indicates that a processing module between the sniffer point and a previous neighboring sniffer point has a fault. If the packet chain is broken after a sniffer point, and a subsequent sniffer point does not capture a corresponding detection packet, it indicates that a processing module after the sniffer point has a fault. Further, the controller may calculate a processing delay, a packet loss, and the like between two sniffer points, to determine processing performance of a processing module between the sniffer points.

FIG. 6 is used as an example for description.

(1) If a packet that accords with a feature can be captured on the vPort 6, but no packet that accords with a feature is captured on the vPort 2, or if a quantity of packets that accord with a feature and that are captured on the vPort 2 is less than a quantity of packets that accord with a feature and that are captured on the vPort 6, it indicates that there is a packet loss in the OVS or a packet is tampered in the OVS.

(2) Likewise, if a packet that accords with a feature can be captured on the vPort 1, but no packet that accords with a feature is captured on the vPort 5, or if a quantity of packets that accord with a feature and that are captured on the vPort 5 is less than a quantity of packets that accord with a feature and that are captured on the vPort 1, it indicates that there is a packet loss in the OVS or a packet is tampered in the OVS.

(3) If a packet that accords with a feature can be captured on the vNIC 2, but no packet that accords with a feature is captured on the vNIC 1, or if a quantity of packets that accord with a feature and that are captured on the vNIC 1 is less than a quantity of packets that accord with a feature and that are captured on the vNIC 2, it indicates that there is a packet loss in the VxLAN GW VM or an error occurs in packet conversion in the VxLAN GW VM.

Figure 7:
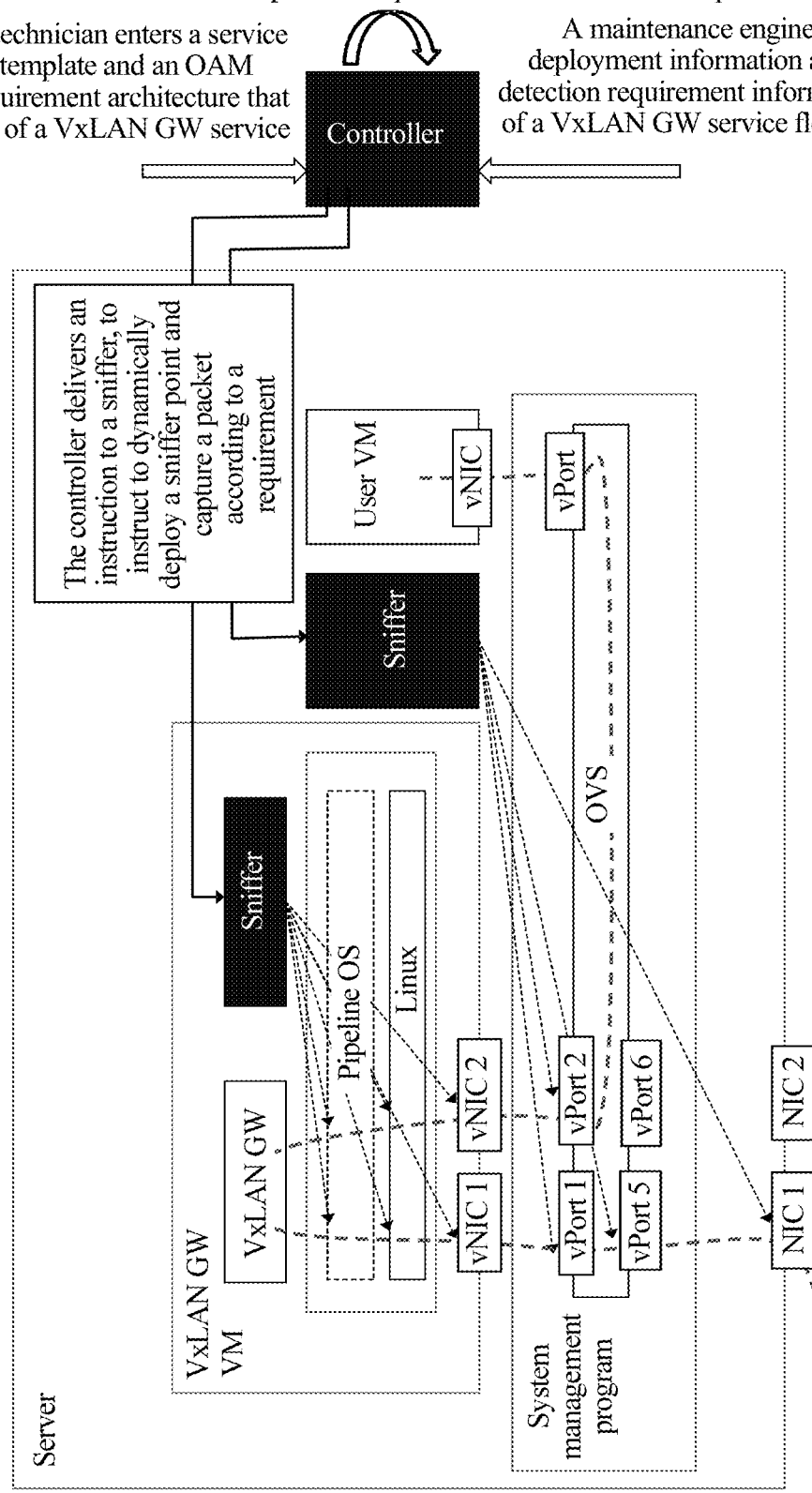
FIG. 7 is another deployment schematic diagram of detecting a VxLAN GW service according to an embodiment of this application.

A plurality of changes may be made to this embodiment. For example, when a user is willing to cooperate in a test in a deployment scenario, a trigger is no longer required. In this case, a scenario deployment diagram is shown in FIG. 7. A user VM performs a function of a trigger as a substitute, and cooperates in generation of a detection packet used for detection. A sniffer is still responsible for capturing a detection packet with a designated feature at a designated sniffer point.

In addition, the operation and maintenance engineer may designate a detection range according to an actual requirement using detection requirement information. Consequently, detection points are deployed differently. For example, if only processing performed at the VxLAN GW is of concern, and no other component is of concern, a detection point only needs to be deployed on the vNIC 1 and the vNIC 2. If there is a need to learn about the components inside the VxLAN GW VM, the controller can add a sniffer point to a Linux core and the pipeline OS.

Embodiment 2

With reference to a video stream transmission scenario, the following describes a network device service quality detection method provided in this embodiment of the present invention.

Figure 8:
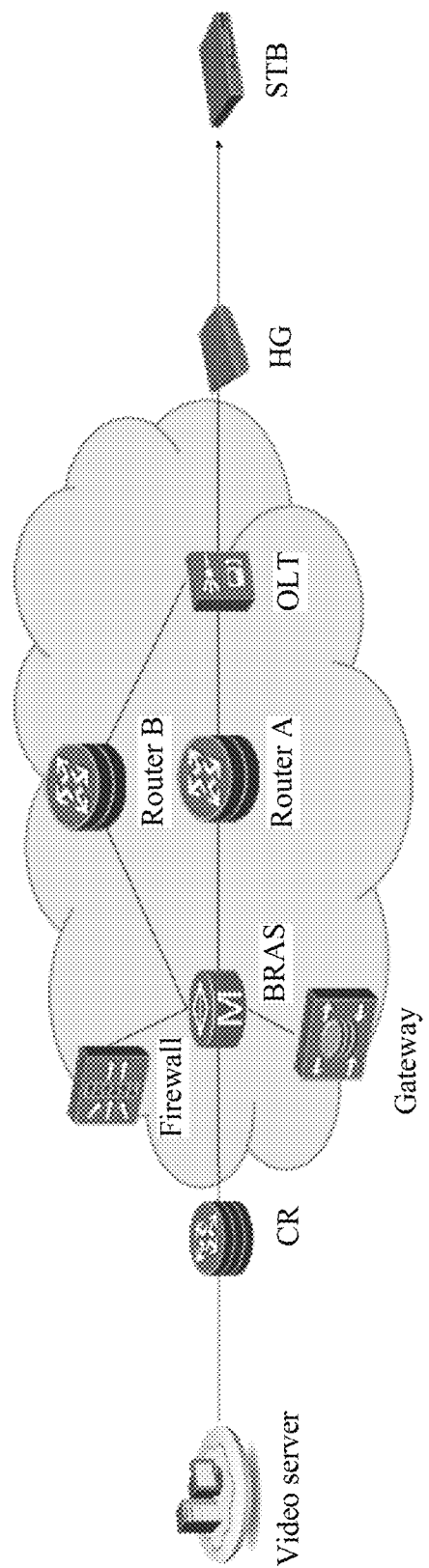
FIG. 8 is a schematic architecture diagram of a video stream transmission system according to an embodiment of this application.

FIG. 8 is an architecture diagram of a video stream transmission system according to one embodiment. In FIG. 8, a video stream flows from a video server to a home set top box (STB).

In a video transmission service, there are usually a plurality of video transmission paths. As shown in FIG. 8, a broadband remote access server (BRAS) may transmit a video stream using a router A, or may transmit a video stream using a router B. There are usually a plurality of network devices on each path, such as a core router (CR), a firewall, a gateway, a router, an optical line terminal (OLT), and a home gateway (HG).

Locating an end-to-end fault may be performed on a faulty video stream by the following operations:

Operation 1: A controller obtains service templates of various types of network devices.

Operation 2: The controller obtains a flow identifier of a faulty video stream, such as quintuple information of the stream.

In this embodiment, the flow identifier of the video stream is equivalent to deployment information of the video stream.

Operation 3: The controller obtains an expected template by combining the information in the foregoing two operations.

Specifically, the controller determines two endpoints of a forwarding path of the video stream according to the flow identifier of the video stream, then searches a software-defined networking (SDN) control center or a network management device for a topology in a range between the two endpoints, and further obtains, with reference to a flow table of each network device in the topology, the forwarding path of the video stream, an egress and an ingress of each network device through which the video stream passes, and a network device on the forwarding path of the video stream. Finally, with reference to the forwarding path of the video stream and a service template of the network device on the forwarding path of the video stream, the controller obtains a packet feature that should be presented by the video stream at each of the egress and the ingress of each network device, and fills a dynamic part of each service template with the flow identifier and the forwarding path that are of the video stream and the packet feature that should be presented by the video stream at each of the egress and the ingress of each network device on the forwarding path, to generate an expected template of the video flow.

Operation 4: The controller dynamically deploys a detection point.

The controller may deploy a detection point on each network device through which the video stream passes, or may deploy a detection point on each of two endpoints of a detection range. In addition, the controller needs to indicate a packet feature that should be focused on at each detection point.

Figure 9:
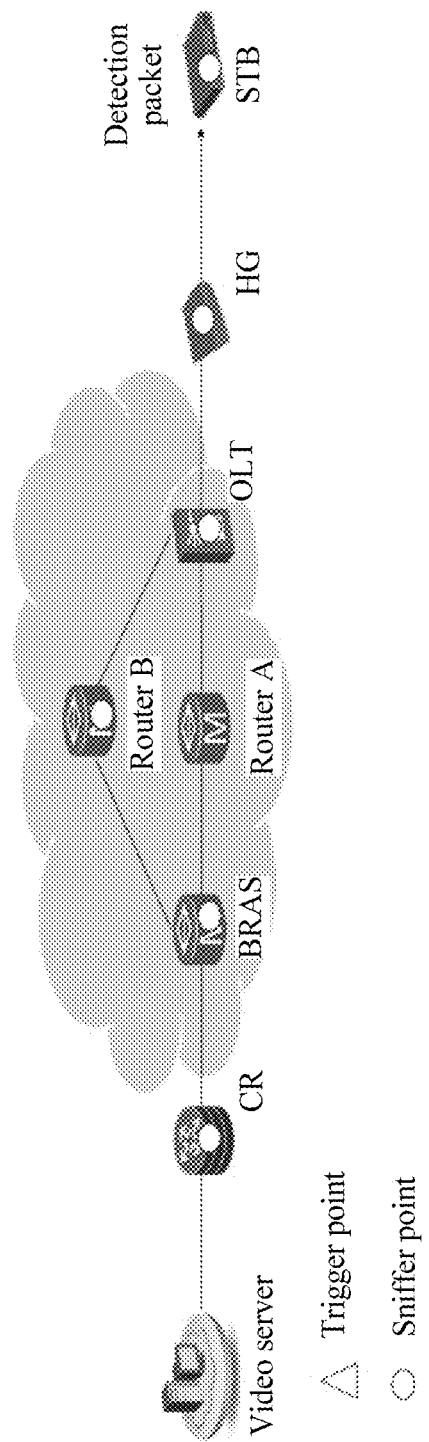
FIG. 9 is a schematic diagram of a deployment location of a detection point in a video stream transmission system according to an embodiment of this application.

For example, as shown in FIG. 9, the controller may deploy a trigger inside the video server, and instructs the trigger to generate a detection packet in a designated format according to a designated frequency within a designated time period. The detection packet has the same flow information as the faulty video stream. In this way, it may be ensured that the detection packet and the video stream pass through a same forwarding path. In addition, the controller may deploy sniffers at egresses and ingresses of network devices such as the CR, the BRAS, the router B, the OLT, the HG and the STB, and instruct these sniffers to capture a detection packet in a designated format within a designated time period.

Operation 5: A trigger generates a detection packet according to a requirement of the controller, and a sniffer captures a detection packet according to a requirement of the controller, and reports the captured detection packet to the controller.

Operation 6: The controller compares a detection packet fed back by each sniffer with the expected template, to obtain a fault delimiting and locating result by means of analysis.

The controller compares a packet captured at each of an egress and an ingress of each network device with an expected template of the network device, so as to learn whether processing performed by each network device is correct, and whether there is a performance problem such as a delay or a packet loss, and then locate a fault on the video transmission path of the video stream.

A transmission process of each video stream may be understood as cascading of processing processes of a plurality of network devices. Therefore, for a process of detecting a fault inside each network device, refer to Embodiment 1.

Figure 10:
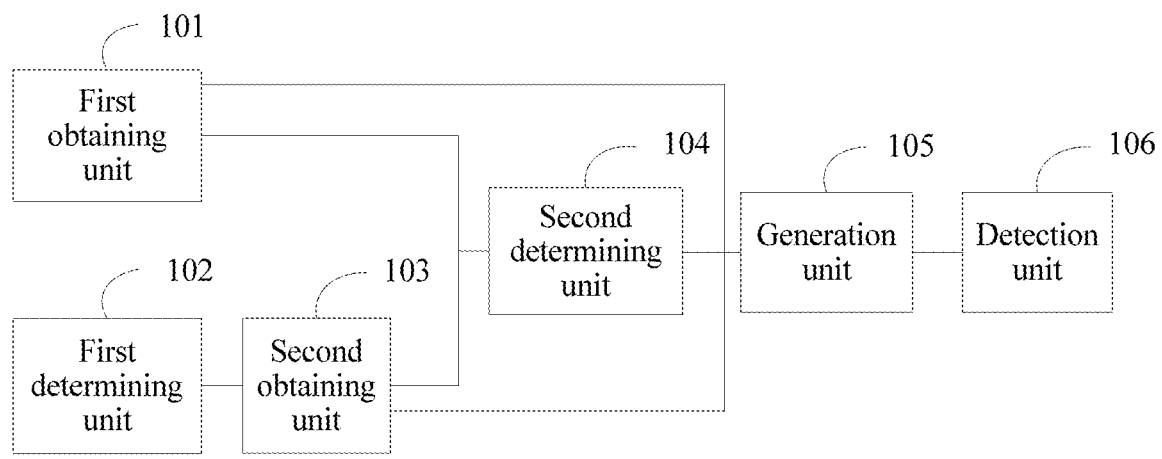
FIG. 10 is a schematic structural diagram of a network device service quality detection apparatus according to an embodiment of this application.

Based on the network device service quality detection method provided in some embodiments of this application, this application further provides a network device service quality detection apparatus. As shown in FIG. 10, the network device service quality detection apparatus includes a first obtaining unit 101, a first determining unit 102, a second obtaining unit 103, a second determining unit 104, a generation unit 105, and a detection unit 106.

The first obtaining unit 101 is configured to obtain a flow identifier and deployment information that are of a to-be-detected service flow, where the deployment information is used to indicate a service function deployment location and a service function parameter that are corresponding to the service flow.

The first determining unit 102 is configured to determine a service type of the to-be-detected service flow.

The second obtaining unit 103 is configured to obtain a predefined service template of the service type, where the service template includes a fixed part and a dynamic part, the fixed part is used to describe a service function feature of the service type, and the dynamic part is used to fill with specific information of the to-be-detected service flow.

The second determining unit 104 is configured to determine, according to the fixed part, the flow identifier, and the deployment information, a forwarding path of the service flow and a packet feature that should be presented by the service flow on each network device on the forwarding path.

The generation unit 105 is configured to: fill the dynamic part of the service template with the flow identifier, the deployment information, and the forwarding path that are of the service flow, and the packet feature that should be presented by the service flow on each network device on the forwarding path, to generate an expected template of the service flow.

The detection unit 106 is configured to detect service quality of a network device on the forwarding path according to the expected template.

Optionally, the detection unit 106 is specifically configured to: instruct, according to the expected template, a first network device on the forwarding path to generate a first detection packet, and instruct, according to the expected template, the first network device to forward the first detection packet along the forwarding path; instruct, according to the expected template, a second network device on the forwarding path to capture a second detection packet, where the second detection packet is a packet that is obtained after the first detection packet is forwarded to and has reached the second network device, and the second detection packet has at least one packet feature that should be presented by the service flow on the second network device and that is described in the expected template; and determine service quality of a network device between the first network device and the second network device on the forwarding path according to whether the second network device can capture the second detection packet and whether the second detection packet has all packet features that should be presented by the service flow on the second network device and that are described in the expected template.

Optionally, the apparatus may further include:

a third obtaining unit, configured to: obtain detection requirement information of the service flow before the detection unit 106 instructs the first network device on the forwarding path to generate the first detection packet, where the detection requirement information includes a detection range, a detection time period, and a detection frequency, and the detection range includes at least one to-be-detected network device on the forwarding path.

Correspondingly, the detection unit 106 is configured to: use a network device, on the forwarding path, that appears first in the detection range as the first network device; and use each network device in the detection range on the forwarding path as the second network device, or use each network device other than the first network device in the detection range on the forwarding path as the second network device; instruct the first network device on the forwarding path to generate at least one first detection packet according to the detection frequency within the detection time period; and instruct the second network device to capture the second detection packet within the detection time period.

Optionally, a packet header of the first detection packet may be the same as a packet header of a packet in the service flow, and a payload of the first detection packet and that of the second detection packet each may include a first field and a second field; the first field is used to indicate that a packet is a detection packet; the second field is used to indicate an action that needs to be performed on a packet by a network device through which the packet passes; and the action includes at least one of the following: adding a time stamp to a payload of the packet, forwarding the packet to a next-hop network device on the forwarding path, copying the packet and sending the copied packet to the controller, or discarding the packet.

Optionally, the packet feature may be represented by an offset, a length, and a value of a field included in the packet.

Optionally, when determining the service quality of the network device between the first network device and the second network device on the forwarding path according to whether the second network device can capture the second detection packet and whether the second detection packet has all the packet features that should be presented by the service flow on the second network device and that are described in the expected template, the detection unit 106 is configured to: if the second network device can capture the second detection packet, and the second detection packet has all the packet features that should be presented by the service flow on the second network device and that are described in the expected template, determine all network devices between the first network device and the second network device on the forwarding path which are functioning normally; or if the second network device can capture the second detection packet, but the second detection packet does not have all the packet features that should be presented by the service flow on the second network device and that are described in the expected template, determine at least one network device between the first network device and the second network device on the forwarding path that is faulty; or if the second network device does not capture the second detection packet, determine at least one network device between the first network device and the second network device on the forwarding path that is faulty.

Optionally, the payload of the first detection packet and that of the second detection packet each may further include a sequence number that is used to identify a packet generation sequence, and a sequence number included in the second detection packet is the same as a sequence number included in the first detection packet. The detection unit 106 may determine, according to the sequence number, that the second detection packet is the packet that is obtained after a forwarding is performed on the first detection packet and the first detection packet has reached the second network device.

Correspondingly, the first detection packet and the second detection packet instruct, using the second field, a network device on the forwarding path to add a time stamp to the payload of the first detection packet or the second detection packet when forwarding the first detection packet or the second detection packet.

Correspondingly, when determining delay performance of the network device between the first network device and the second network device on the forwarding path according to the second detection packet, the detection unit 106 is configured to: if the second network device can capture the second detection packet, and the second detection packet has all the packet features that should be presented by the service flow on the second network device and that are described in the expected template, calculate a delay between the first network device and the second network device according to a time stamp in the first detection packet and a time stamp in the second detection packet.

Optionally, when determining packet loss rate performance of the network device between the first network device and the second network device on the forwarding path according to the second detection packet, the detection unit 106 is configured to: if the second network device can capture the second detection packet, and the second detection packet has all the packet features that should be presented by the service flow on the second network device and that are described in the expected template, calculate a packet loss rate between the first network device and the second network device according to a quantity of second detection packets captured by the second network device and a quantity of first detection packets generated by the first network device.

For details that are not described in this embodiment, refer to the description of the controller in the method shown in FIG. 4. Details are not described herein again.

It should be noted that the unit division in this embodiment of the present invention is an example, and is merely logical function division. There may be another division manner in actual implementation. Functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

Figure 11:
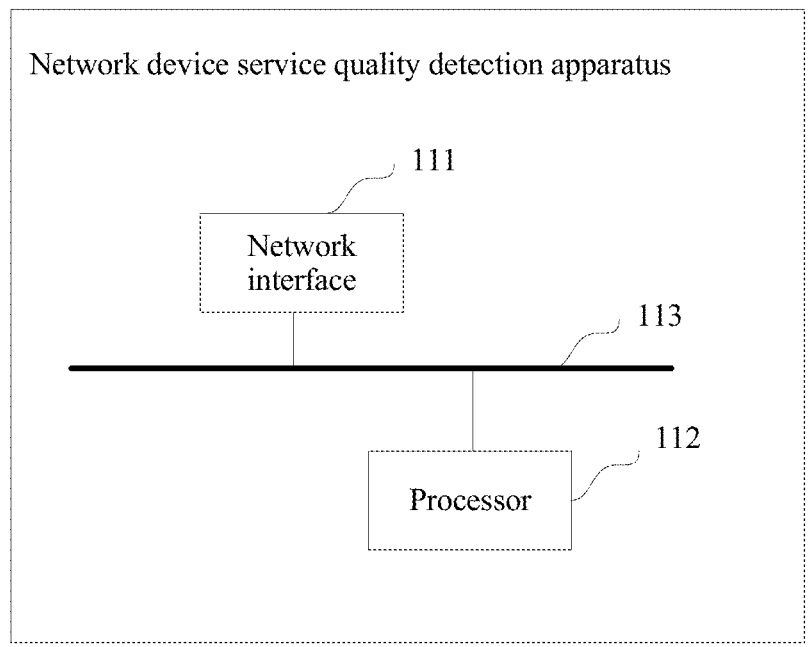
FIG. 11 is a schematic structural diagram of another network device service quality detection apparatus according to an embodiment of this application.

When the integrated unit is implemented in the form of hardware, the first obtaining unit 101, the first determining unit 102, the second obtaining unit 103, the second determining unit 104, the generation unit 105, and the detection unit 106 may be a processor, such as a processor 112 in FIG. 11.

Based on the network device service quality detection method provided above, this application further provides a network device service quality apparatus. As shown in FIG. 11, the apparatus includes a network interface 111 and a processor 112. For example, the network interface 111 and the processor 112 are connected to each other using a bus 113.

The processor 112 in one embodiment is configured to perform the following operations:

obtaining, using the network interface 111, a flow identifier and deployment information that are of a to-be-detected service flow, where the deployment information is used to indicate a service function deployment location and a service function parameter corresponding to the service flow; determining a service type of the to-be-detected service flow; obtaining a predefined service template of the service type, where the service template includes a fixed part and a dynamic part, the fixed part is used to describe a service function feature of the service type, and the dynamic part is used to fill with specific information of the to-be-detected service flow; determining, according to the fixed part, the flow identifier, and the deployment information, a forwarding path of the service flow and a packet feature that should be presented by the service flow on each network device on the forwarding path; filling the dynamic part of the service template with the flow identifier, the deployment information, and the forwarding path that are of the service flow, and the packet feature that should be presented by the service flow on each network device on the forwarding path, to generate an expected template of the service flow; and detecting service quality of a network device on the forwarding path according to the expected template.

The network interface 111 may be a wired interface, such as a fiber distributed data interface (FDDI) or an Ethernet interface. Alternatively, the network interface 111 may be a wireless interface, such as a wireless local area network interface.

The processor 112 may be a general purpose processor, including a central processing unit (CPU), a network processor (NP), and the like; or may be a digital signal processor (DSP), an application-specific integrated circuit (ASIC), a field-programmable gate array (FPGA) or another programmable logic device, or the like.

When the processor 112 is a CPU, the apparatus may further include a memory, configured to store a program. Specifically, the program may include program code, and the program code includes a computer operation instruction. The memory may include a random access memory (RAM), and may further include a nonvolatile memory such as at least one magnetic disk memory. The processor 112 executes the program code stored in the memory, to implement the foregoing functions.

In conclusion, a template classification manner is used in the technical solutions provided in this application, using a hierarchical template, an operation and maintenance engineer needs to provide deployment information and detection requirement information that are familiar to the operation and maintenance engineer, all service-related complex information is provided in a template form by a professional technician at a time. A service function feature of a network device is built into a service template as a fixed part. The operation and maintenance engineer does not need to learn of a service function feature of each network device, and only needs to provide a flow identifier, deployment information, and the like that are of a to-be-detected service flow. A controller dynamically deploys a detection point according to the flow identifier and the deployment information of the service flow that are provided by the operation and maintenance engineer and the fixed part of the service template, so as to automatically detect service quality of a network device, and reduce operation and maintenance complexity and difficulties.

Persons skilled in the art should understand that embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

Although some embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

What is claimed is:

1. A network device service quality detection method, comprising:
   obtaining, by a controller, an expected template of a service flow,
      wherein the expected template comprises a flow identifier of the service flow, a forwarding path of the service flow, and a packet feature presented by the service flow on each network device on the forwarding path;
   instructing, by the controller according to the expected template, a first network device on the forwarding path to generate a first detection packet, and instructing, according to the expected template, the first network device to forward the first detection packet along the forwarding path;
   instructing, by the controller according to the expected template, a second network device on the forwarding path to capture a second detection packet, wherein the second detection packet is a packet that is obtained after the first detection packet has been forwarded to and has reached the second network device, and the second detection packet has at least one packet feature presented by the service flow on the second network device as described in the expected template; and determining, by the controller, service quality of a network device between the first network device and the second network device on the forwarding path according to whether the second network device can capture the second detection packet and whether the second detection packet has all packet features presented by the service flow on the second network device as described in the expected template.

2. The method according to claim 1, wherein before the instructing, by the controller, a first network device on the forwarding path to generate a first detection packet, the method further comprises:

obtaining, by the controller, detection requirement information of the service flow, wherein the detection requirement information comprises a detection range, a detection time period, and a detection frequency, and wherein the detection range comprises at least one to-be-detected network device on the forwarding path;

using, by the controller, a network device, on the forwarding path, that appears first in the detection range as the first network device; and using, by the controller, each network device in the detection range on the forwarding path as the second network device, or using each network device other than the first network device in the detection range on the forwarding path as the second network device;

the instructing, by the controller, a first network device on the forwarding path to generate a first detection packet comprises:

instructing, by the controller, the first network device on the forwarding path to generate at least one first detection packet according to the detection frequency within the detection time period; and the instructing, by the controller, a second network device on the forwarding path to capture a second detection packet comprises:

instructing, by the controller, the second network device to capture the second detection packet within the detection time period.

3. The method according to claim 1, wherein a packet header of the first detection packet is the same as a packet header of a packet in the service flow, and a payload of the first detection packet and the second detection packet each comprises a first field and a second field;

the first field is used to indicate that a packet is a detection packet;

the second field is used to indicate an action is required to be performed on a packet by a network device through which the packet passes; and the action comprises at least one of the following: adding a time stamp to a payload of the packet, forwarding the packet to a next-hop network device on the forwarding path, copying the packet and sending the copied packet to the controller, or discarding the packet.

4. The method according to claim 3, wherein the payload of the first detection packet and that of the second detection packet each further comprises a sequence number that is used to identify a packet generation sequence, a sequence number comprised in the second detection packet is the same as a sequence number comprised in the first detection packet, and the controller determines, according to the sequence number, that the second detection packet is the packet that is obtained after the first detection packet has been forwarded to and has reached the second network device;

the first detection packet and the second detection packet instruct, using the second field, a network device on the forwarding path to add a time stamp to the payload of the first detection packet or the second detection packet when forwarding the first detection packet or the second detection packet; and the determining, by the controller, service quality of a network device between the first network device and the second network device on the forwarding path comprises:

if the second network device can capture the second detection packet, and the second detection packet has all the packet features presented by the service flow on the second network device as described in the expected template, calculating, by the controller, a delay between the first network device and the second network device according to a time stamp in the first detection packet and a time stamp in the second detection packet.

5. The method according to claim 1, wherein the packet feature is represented by an offset, a length, and a value of a field in the packet.

6. The method according to claim 1, wherein the determining, by the controller, service quality of a network device between the first network device and the second network device on the forwarding path comprises:

if the second network device can capture the second detection packet, and the second detection packet has all the packet features presented by the service flow on the second network device as described in the expected template, determining, by the controller, that all network devices between the first network device and the second network device on a forwarding path function normally.

7. The method according to claim 1, wherein the determining, by the controller, service quality of a network device between the first network device and the second network device on the forwarding path comprises:

if the second network device can capture the second detection packet, but the second detection packet does not have all the packet features presented by the service flow on the second network device as described in the expected template, determining, by the controller, that at least one network device between the first network device and the second network device on the forwarding path is faulty.

8. The method according to claim 1, wherein the determining, by the controller, service quality of a network device between the first network device and the second network device on the forwarding path comprises:

if the second network device does not capture the second detection packet, determining, by the controller, that at least one network device between the first network device and the second network device on the forwarding path is faulty.

9. The method according to claim 1, wherein the determining, by the controller, service quality of a network device between the first network device and the second network device on the forwarding path comprises:

if the second network device can capture the second detection packet, and the second detection packet has all the packet features presented by the service flow on the second network device as described in the expected template, calculating, by the controller, a packet loss rate between the first network device and the second network device according to a quantity of second detection packets captured by the second network device and a quantity of first detection packets generated by the first network device.

10. A network device service quality detection apparatus, comprising:
- a processor; and
- a non-transitory computer readable medium which contains computer-executable instructions;
- the processor is configured to execute the computer-executable instructions to perform operations comprising:
  - obtaining an expected template of a service flow, wherein the expected template comprises a flow identifier of the service flow, a forwarding path of the service flow, and a packet feature presented by the service flow on each network device on the forwarding path; and
  - detecting service quality of a network device on the forwarding path according to the expected template, wherein the operation of detecting service quality of a network device on the forwarding path according to the expected template comprises:
    - instructing according to the expected template, a first network device on the forwarding path to generate a first detection packet, and instructing, according to the expected template, the first network device to forward the first detection packet along the forwarding path;
    - instructing according to the expected template, a second network device on the forwarding path to capture a second detection packet, wherein the second detection packet is a packet that is obtained after the first detection packet has been forwarded to and has reached the second network device, and the second detection packet has at least one packet feature presented by the service flow on the second network device and that is described in the expected template; and
    - determining service quality of a network device between the first network device and the second network device on the forwarding path according to whether the second network device can capture the second detection packet and whether the second detection packet has all packet features presented by the service flow on the second network device as described in the expected template.

11. The apparatus according to claim 10, wherein before the operation of instructing a first network device on the forwarding path to generate a first detection packet, the processor is further configured to execute the computer-executable instructions to perform an operation comprising:
- obtaining detection requirement information of the service flow, wherein the detection requirement information comprises a detection range, a detection time period, and a detection frequency, and wherein the detection range comprises at least one to-be-detected network device on the forwarding path;
- using a network device, on the forwarding path, that appears first in the detection range as the first network device; and
- using each network device in the detection range on the forwarding path as the second network device, or using each network device other than the first network device in the detection range on the forwarding path as the second network device;
- the operation of instructing a first network device on the forwarding path to generate a first detection packet comprises: instructing the first network device on the forwarding path to generate at least one first detection packet according to the detection frequency within the detection time period; and
- the operation of instructing a second network device on the forwarding path to capture a second detection packet comprises: instructing the second network device to capture the second detection packet within the detection time period.

12. The apparatus according to claim 10, wherein a packet header of the first detection packet is the same as a packet header of a packet in the service flow, and a payload of the first detection packet and that of the second detection packet each comprises a first field and a second field;
- the first field is used to indicate that a packet is a detection packet;
- the second field is used to indicate an action that needs to be performed on a packet by a network device through which the packet passes; and
- the action comprises at least one of the following: adding a time stamp to a payload of the packet, forwarding the packet to a next-hop network device on the forwarding path, copying the packet and sending the copied packet to the apparatus, or discarding the packet.

13. The apparatus according to claim 12, wherein the payload of the first detection packet and that of the second detection packet each further comprises a sequence number that is used to identify a packet generation sequence, a sequence number comprised in the second detection packet is the same as a sequence number comprised in the first detection packet, and the processor is further configured to execute the computer-executable instructions to determine according to the sequence number, that the second detection packet is the packet that is obtained after the first detection packet has been forwarded to and has reached the second network device;
- the first detection packet and the second detection packet instruct, using the second field, a network device on the forwarding path to add a time stamp to the payload of the first detection packet or the second detection packet when forwarding the first detection packet or the second detection packet; and
- the operation of determining service quality of a network device between the first network device and the second network device on the forwarding path comprises:
  - if the second network device can capture the second detection packet, and the second detection packet has all the packet features presented by the service flow on the second network device as described in the expected template, calculating a delay between the first network device and the second network device according to a time stamp in the first detection packet and a time stamp in the second detection packet.

14. The apparatus according to claim 10, wherein the packet feature is represented by an offset, a length, and a value of a field in the packet.

15. The apparatus according to claim 10, wherein the operation of determining service quality of a network device between the first network device and the second network device on the forwarding path comprises:
- if the second network device can capture the second detection packet, and the second detection packet has all the packet features presented by the service flow on the second network device as described in the expected template, determining that all network devices between the first network device and the second network device on the forwarding path have a normal function.

16. The apparatus according to claim 10, wherein the operation of determining service quality of a network device between the first network device and the second network device on the forwarding path comprises:

if the second network device can capture the second detection packet, but the second detection packet does not have all the packet features presented by the service flow on the second network device as described in the expected template, determining that at least one network device between the first network device and the second network device on the forwarding path is faulty.

17. The apparatus according to claim 10, wherein the operation of determining service quality of a network device between the first network device and the second network device on the forwarding path comprises:

if the second network device does not capture the second detection packet, determining that at least one network device between the first network device and the second network device on the forwarding path is faulty.

18. The apparatus according to claim 10, wherein the operation of determining service quality of a network device between the first network device and the second network device on the forwarding path comprises:

if the second network device can capture the second detection packet, and the second detection packet has all the packet features presented by the service flow on the second network device as described in the expected template, calculating a packet loss rate between the first network device and the second network device according to a quantity of second detection packets captured by the second network device and a quantity of first detection packets generated by the first network device.

* * * * *